United States Patent
Honorio Araujo da Silva et al.

(10) Patent No.: US 11,683,151 B2
(45) Date of Patent: Jun. 20, 2023

(54) METHODS AND SYSTEMS FOR DISTRIBUTED COMPUTATION WITHIN A FULLY HOMOMORPHIC ENCRYPTION SCHEME USING P-ADIC NUMBERS

(71) Applicant: Algemetric, LLC, Colorado Springs, CO (US)

(72) Inventors: David W. Honorio Araujo da Silva, Colorado Springs, CO (US); Carlos A. Paz de Araujo, Colorado Springs, CO (US); Jordan Isabella Pattee, Colorado Springs, CO (US)

(73) Assignee: Algemetric, Inc., Colorado Springs, CO (US)

( * ) Notice: Subject to any disclaimer, the term of this patent is extended or adjusted under 35 U.S.C. 154(b) by 0 days.

(21) Appl. No.: 17/478,839

(22) Filed: Sep. 17, 2021

(65) Prior Publication Data
US 2022/0085973 A1    Mar. 17, 2022

Related U.S. Application Data

(60) Provisional application No. 63/079,676, filed on Sep. 17, 2020.

(51) Int. Cl.
*H04L 9/00*     (2022.01)
*H04L 9/32*     (2006.01)
*H04L 9/30*     (2006.01)

(52) U.S. Cl.
CPC ............... *H04L 9/008* (2013.01); *H04L 9/30* (2013.01); *H04L 9/3033* (2013.01); *H04L 9/3249* (2013.01)

(58) Field of Classification Search
CPC ..... H04L 9/008; H04L 9/3033; H04L 9/3093; H04L 9/30; H04L 9/3249
See application file for complete search history.

(56) References Cited

U.S. PATENT DOCUMENTS

| | | | |
|---|---|---|---|
| 4,405,829 A | 9/1983 | Vest et al. | |
| 5,751,808 A | 5/1998 | Anshel et al. | |
| (Continued) | | | |

FOREIGN PATENT DOCUMENTS

| | | |
|---|---|---|
| CN | 107147484 A | 9/2017 |
| CN | 109831297 A | 5/2019 |
| (Continued) | | |

OTHER PUBLICATIONS

Chow et al . An Efficient Homomorphic Data Encoding with Multiple Secret Hensel Codes, published Mar. 2020 (Year: 2020).*

(Continued)

*Primary Examiner* — Vu V Tran
(74) *Attorney, Agent, or Firm* — Christopher P. Whitham; Cochran Freund & Young LLC

(57) ABSTRACT

Disclosed are methods and systems to provide distributed computation within a Fully Homomorphic Encryption (FHE) system by using g-adic properties to separate a ciphertext into multiple ciphertexts for each Hensel digit level. A number t of computation units may individually perform addition and/or multiplication of each Hensel digit level on each of the computation units and then reconstruct the resulting value from the result ciphertext of each computation unit using p-adic and g-adic operations. Accordingly, computation burdens may be distributed to several computation units.

6 Claims, 2 Drawing Sheets

100 BLOCK DIAGRAM OF HARDWARE IMPLEMENTATION FOR A FHE DISTRIBUTED COMPUTATION EMBODIMENT

(56) References Cited

U.S. PATENT DOCUMENTS

| | | |
|---|---|---|
| 6,560,336 B1 | 5/2003 | Arita |
| 6,853,964 B1 | 2/2005 | Rockwood et al. |
| 8,452,975 B2 | 5/2013 | Futa et al. |
| 8,515,058 B1 | 8/2013 | Gentry |
| 8,719,324 B1 | 5/2014 | Koc et al. |
| 9,083,526 B2 | 7/2015 | Gentry |
| 9,716,590 B2 | 7/2017 | Gentry |
| 9,749,129 B2 | 8/2017 | Delerablee et al. |
| 9,906,360 B2 | 2/2018 | Johnson et al. |
| 2003/0223579 A1 | 12/2003 | Kanter et al. |
| 2005/0193012 A1 | 9/2005 | Matsayuma et al. |
| 2006/0179489 A1* | 8/2006 | Mas Ribes ......... H04N 21/4367 348/E7.056 |
| 2007/0297614 A1 | 12/2007 | Rubin |
| 2008/0080710 A1 | 4/2008 | Harley et al. |
| 2009/0136033 A1 | 5/2009 | Sy |
| 2009/0282040 A1 | 11/2009 | Callaghan et al. |
| 2012/0140920 A1 | 6/2012 | Ghouti et al. |
| 2013/0254532 A1 | 9/2013 | Raykova et al. |
| 2013/0322537 A1 | 12/2013 | Rossato et al. |
| 2014/0140514 A1 | 5/2014 | Gentry |
| 2015/0039912 A1 | 2/2015 | Payton et al. |
| 2015/0100785 A1 | 4/2015 | Joye et al. |
| 2015/0170197 A1 | 6/2015 | Smith et al. |
| 2015/0295712 A1 | 10/2015 | Veugen |
| 2015/0381348 A1 | 12/2015 | Takenaka et al. |
| 2016/0105402 A1 | 4/2016 | Soon-Shiong et al. |
| 2016/0119119 A1* | 4/2016 | Calapodescu ....... G06F 21/6227 380/30 |
| 2019/0044697 A1 | 2/2019 | Paz de Araujo et al. |
| 2019/0109701 A1 | 4/2019 | Paz de Araujo et al. |
| 2019/0164153 A1 | 5/2019 | Agrawal et al. |
| 2020/0028674 A1 | 1/2020 | Bao et al. |

FOREIGN PATENT DOCUMENTS

| | | |
|---|---|---|
| WO | 2012069747 A1 | 5/2012 |
| WO | 2014016795 A2 | 1/2014 |

OTHER PUBLICATIONS

Hensel Codes of Square Roots of P-ADIC Numbers, by Knapp et al., published 2010 (Year: 2010).*

P-adic number theory and its applications in a cryptographic form, by Raouf, published Jun. 1986 (Year: 1986).*

Wang, et al., "Discrete logarithm based additively homomorphic encryption and secure data aggregation", Information Sciences, 181, (2011), pp. 3308-3322.

International Search Report and Written Opinion for PCT/US2018/16000, International Searching Authority, dated Apr. 25, 2018, 14 pages.

Extended European Search Report, PCT/US2017/045141, dated Nov. 22, 2019, 8 pages.

Kumar, Mohit, et al., "Efficient implementation of Advanced Encryption Standard (AES) for ARM based Platforms", 1st Int'l Conf. on Recent Advances in Information Technology, RAIT-20121, 2012, 5 pages.

Hitzer, Echkard, et al., "Applications of Clifford's Geometric Algebra", Adv. Appl. Clifford Algebras 23, (2013), DOI 10.1007, pp. 377-404.

Non-Final Office Action, entitled, "Methods and Systems for Enhanced Data-Centric Additive Homomorphic Encryption Systems Using Geometric Algebra", dated Jan. 15, 2020.

Non-Final Office Action, entitled, "Methods and Systems for Enhanced Data-Centric Scalar Multiplicative Homomorphic Encryption Systems Using Geometric Algebra", dated Feb. 6, 2020.

Fau, et al., "Towards practical program execution over fully homomorphic encryption schemes", IEEE Computer Society, DOI 10.1109/3PGCIC, (2013), pp. 284-290.

Erkin, et al., "Generating private recommendations efficiently using homomorphic encryption and data packing", In: IEEE transactions on information forensics and security, vol. 7, No. 3, Jun. 2012, pp. 1053-1066.

Chatterjee et al., "Searching and Sorting of Fully Homomorphic Encrypted Data on Cloud", IACR Cryptology ePrint Archive, Oct. 10, 2015, pp. 1-14.

Emmadi et al., "Updates on sorting of fully homomorphic encrypted data", 2015 International Conference on Cloud Computing Research and Innovation (ICCCRI), Oct. 27, 2015, 6 pages.

The International Search Report and Written Opinion of the International Searching Authority, PCT/US2018/56154, dated Dec. 27, 2018, 25 pages.

The International Search Report and Written Opinion of the International Searching Authority, PCT/US2018/56156, dated Dec. 27, 2018, 23 pages.

The International Search Report and Written Opinion of the International Searching Authority, PCT/US2017/45141, dated Dec. 18, 2017, 7 pages.

The International Search Report and Written Opinion of the International Searching Authority, PCT/US2018/26305, dated Jul. 3, 2018, 7 pages.

The International Search Report and Written Opinion, for PCT/US21/40218, "Methods and Systems for Homomorphic Data Representation and Concealment Powered by Clifford Geometric Algebra", dated Oct. 1, 2021, 12 pages.

European Examination Report, for Application No. 17 837 619.0-18, entitled, Methods and Systems for Enhanced Data-Centric Encryption Systems Using Geometric Algebra, dated Mar. 18, 2021,10 pages.

James M. Chappell, et al., "The double-padlock problem: is secure classical information transmission possible without key exchange?", School of Electrical and Electronic Engineering, University of Adelaide, SA 5005, Australia, dated Dec. 31, 2012, 4 pages.

The International Search Report and Written Opinion, PCT/US2020/44808, "Methods and Systems for Encryption and Homomorphic Encryption Systems using Geometric Algebra and Hensel Codes", dated May 4, 2021, 18 pages.

The International Search Report and Written Opinion, PCT/US21/45453, "Methods and Systems for Somewhat Homomorphic Encryption and Key Updates Based on Geometric Algebra for Distributed Ledger/Blockchain Technology", dated Nov. 4, 2021, 7 pages.

The International Search Report and Written Opinion, PCT/US21/50994, "Methods and Systems for Distributed Computation Within a Fully Homomorphic Encryption Scheme Using P-Adic Numbers", dated Jan. 28, 2022, 7 pages.

David W.H.A. da Silva, "An Efficient Homomorphic Data Encoding with Multiple Secret Hensel Codes", International Journal of Information and Electronics Engineering, vol. 10, No. 1, Mar. 2002, 11 pages.

* cited by examiner

100 BLOCK DIAGRAM OF HARDWARE IMPLEMENTATION FOR A FHE DISTRIBUTED COMPUTATION EMBODIMENT

METHODS AND SYSTEMS FOR DISTRIBUTED COMPUTATION WITHIN A FULLY HOMOMORPHIC ENCRYPTION SCHEME USING P-ADIC NUMBERS

CROSS REFERENCE TO RELATED APPLICATIONS

This application is based upon and claims the benefit of U.S. provisional application Ser. No. 63/079,676, filed Sep. 17, 2020, entitled "p-adic Numbers and Applications to Cryptography," all of which is also specifically incorporated herein by reference for all that it discloses and teaches.

BACKGROUND OF THE INVENTION

The advancement of science is possible when knowledge is shared and information is exchanged in a seamless manner. In a world where many businesses rely on information as their main assets, analysis over data is a crucial competitive advantage. Consequently, the amount of data processed and stored will continue to increase, creating a demand for virtualized services. To this end, some applications can be provided as cloud computing resources including Internet of Things (IoT), machine learning, virtual reality (VR) and blockchain. As a result, concerns about custody and privacy of data are on the rise.

Modern concealment/encryption employs mathematical techniques that manipulate positive integers or binary bits. Asymmetric concealment/encryption, such as RSA (Rivest-Shamir-Adleman), relies on number theoretic one-way functions that are predictably difficult to factor and can be made more difficult with an ever-increasing size of the encryption keys. Symmetric encryption, such as DES (Data Encryption Standard) and AES (Advanced Encryption Standard), uses bit manipulations within registers to shuffle the concealed text/cryptotext to increase "diffusion" as well as register-based operations with a shared key to increase "confusion." Diffusion and confusion are measures for the increase in statistical entropy on the data payload being transmitted. The concepts of diffusion and confusion in encryption are normally attributed as first being identified by Claude Shannon in the 1940s. Diffusion is generally thought of as complicating the mathematical process of generating unencrypted (plain text) data from the encrypted (cryptotext) data, thus, making it difficult to discover the encryption key of the concealment/encryption process by spreading the influence of each piece of the unencrypted (plain) data across several pieces of the concealed/encrypted (cryptotext) data. Consequently, an encryption system that has a high degree of diffusion will typically change several characters of the concealed/encrypted (cryptotext) data for the change of a single character in the unencrypted (plain) data making it difficult for an attacker to identify changes in the unencrypted (plain) data. Confusion is generally thought of as obscuring the relationship between the unencrypted (plain) data and the concealed/encrypted (cryptotext) data. Accordingly, a concealment/encryption system that has a high degree of confusion would entail a process that drastically changes the unencrypted (plain) data into the concealed/encrypted (cryptotext) data in a way that, even when an attacker knows the operation of the concealment/encryption method (such as the public standards of RSA, DES, and/or AES), it is still difficult to deduce the encryption key.

Homomorphic Encryption is a form of encryption that allows computations to be carried out on concealed cipher text as it is concealed/encrypted without decrypting the cipher text that generates a concealed/encrypted result which, when decrypted, matches the result of operations performed on the unencrypted plaintext.

The word homomorphism comes from the ancient Greek language: ὁμός (homos) meaning "same" and μορφή (morphe) meaning "form" or "shape." Homomorphism may have different definitions depending on the field of use. In mathematics, for example, homomorphism may be considered a transformation of a first set into a second set where the relationship between the elements of the first set are preserved in the relationship of the elements of the second set.

For instance, a map f between sets A and B is a homomorphism of A into B if $$f(a_1 \text{ op } a_2) = f(a_1) \text{ op } f(a_2) | a_1, a_2 \in A$$

where "op" is the respective group operation defining the relationship between A and B.

More specifically, for abstract algebra, the term homomorphism may be a structure-preserving map between two algebraic structures such as groups, rings, or vector spaces. Isomorphisms, automorphisms, and endomorphisms are typically considered special types of homomorphisms. Among other more specific definitions of homomorphism, algebra homomorphism may be considered a homomorphism that preserves the algebra structure between two sets.

SUMMARY OF THE INVENTION

An embodiment of the present invention may comprise a method for distributing an arithmetic computation o across a number t computational units of a private-key Fully Homomorphic Encryption (FHE) system, where t is at least 2, the method comprising: generating by a source device a secret key sk comprised of prime numbers $p_1 \ldots p_{2t}$ and public evaluation key pk equal to g of a g-adic number system; choosing by said source device random numbers $sa_2 \ldots sa_t$ for a message $m_a$; computing by said source device rational number $\alpha_a$ as a g-adic number inverse $H_g^{-1}$ with said prime numbers $p_1 \ldots p_t$ and Hensel codes $ha_1 \ldots ha_t$ where said Hensel codes $ha_1 \ldots ha_t$ are said message $m_a$ and said random numbers $sa_2 \ldots sa_t$; computing by said source device Hensel codes $ha_{t+1} \ldots ha_{2t}$ as g-adic Hensel codes $H_g$ from said prime numbers $p_{t+1} \ldots p_{2t}$ and said rational number $\alpha_a$ such that said Hensel codes $ha_{t+1} \ldots ha_{2t}$ are message $m_a$ ciphertexts $ca_1 \ldots ca_t$; choosing by said source device random numbers $sb_2 \ldots sb_t$ for a message $m_b$; computing by said source device rational number $\alpha_b$ as a g-adic number inverse $H_g^{-1}$ with said prime numbers $p_1 \ldots p_t$ and Hensel codes $hb_1 \ldots hb_t$ where said Hensel codes $hb_1 \ldots hb_t$ are said message $m_b$ and said random numbers $sb_2 \ldots sb_t$; computing by said source device Hensel codes $hb_{t+1} \ldots hb_{2t}$ as g-adic Hensel codes $H_g$ from said prime numbers $p_{t+1} \ldots p_{2t}$ and said rational number $\alpha_b$ such that said Hensel codes $hb_{t+1} \ldots hb_{2t}$ are message $m_b$ ciphertexts $cb_1 \ldots cb_t$; sending by said source device each Hensel digit of said ciphertexts $ca_1 \ldots ca_t$ and each Hensel digit of said ciphertexts $cb_1 \ldots cb_t$ to corresponding computational units 1 ... t, respectively; performing at each computational unit 1 of said computational units 1 ... t arithmetic function $ca_i$ o $cb_i$ to obtain encrypted result $cr_i$ corresponding to said computational unit i; sending by each of said computational units 1 ... t said corresponding encrypted result $cr_i$ to a destination device; computing by said destination device a result rational number $\alpha_r$ as a g-adic number inverse $H_g^{-1}$ with said prime numbers $p_{t+1} \ldots p_{2t}$ and the encrypted results $cr_1 \ldots cr_t$ as Hensel codes for said g-adic number inverse $H_g^{-1}$; and computing by said destination device a result message $m_r$ as Hensel Code Generation H with said prime $p_1$ and said result rational number $\alpha_r$ such that result message $m_r$ is equal to arithmetic function message $m_a$ o message $m_b$.

An embodiment of the present invention may further comprise a private-key Fully Homomorphic Encryption (FHE) system that distributes an arithmetic computation o across a number t computational units, where t is at least 2, the private-key FHE system comprising: a source device, wherein said source device further comprises: a key generation subsystem that generates a secret key sk comprised of prime numbers $p_1 \ldots p_{2t}$ and public evaluation key pk equal to g of a g-adic number system; a random number selection subsystem that chooses random numbers $sa_2 \ldots sa_t$ for a message $m_a$ and random numbers $sb_2 \ldots sb_t$ for a message $m_b$; a message value to rational number subsystem that computes rational number $\alpha_a$ as a g-adic number inverse $H_g^{-1}$ with said prime numbers $p_1 \ldots p_t$ and Hensel codes $ha_1 \ldots ha_t$ where said Hensel codes $ha_1 \ldots ha_t$ are said message $m_a$ and said random numbers $sa_2 \ldots sa_t$, and computes rational number $\alpha_b$ as a g-adic number inverse $H_g^{-1}$ with said prime numbers $p_1 \ldots p_t$ and Hensel codes $hb_1 \ldots hb_t$ where said Hensel codes $hb_1 \ldots hb_t$ are said message $m_b$ and said random numbers $sb_2 \ldots sb_t$; an encryption subsystem that computes Hensel codes $ha_{t+1} \ldots ha_{2t}$ as g-adic Hensel codes $H_g$ from said prime numbers $p_{t+1} \ldots p_{2t}$ and said rational number $\alpha_a$ such that said Hensel codes $ha_{t+1} \ldots ha_{2t}$ are message $m_a$ ciphertexts $ca_1 \ldots ca_t$, and computes Hensel codes $hb_{t+1} \ldots hb_{2t}$ as g-adic Hensel codes $H_g$ from said prime numbers $p_{t+1} \ldots p_{2t}$ and said rational number $\alpha_b$ such that said Hensel codes $hb_{t+1} \ldots hb_{2t}$ are message $m_b$ ciphertexts $cb_1 \ldots cb_t$; a ciphertext Hensel digit send subsystem that sends each Hensel digit of said ciphertexts $ca_1 \ldots ca_t$ and each Hensel digit of said ciphertexts $cb_1 \ldots cb_t$ to corresponding computational units $1 \ldots t$, respectively; said computational units $1 \ldots t$, wherein each of said computational units $1 \ldots t$ further comprises: an arithmetic function subsystem that performs at each computational unit i of said computational units $1 \ldots t$ arithmetic function $ca_i o cb_i$ to obtain encrypted result $cr_i$ corresponding to said computational unit i; an encrypted result send subsystem that sends said encrypted result $cr_i$ that corresponds to said computational unit i of said computational units $1 \ldots t$ to a destination device; and said destination device, wherein said destination device further comprises: a result rational number computation subsystem that computes a result rational number $\alpha_r$ as a g-adic number inverse $H_g^{-1}$ with said prime numbers $p_{t+1} \ldots p_{2t}$ and the encrypted results $cr_1 \ldots cr_t$ as Hensel codes for said g-adic number inverse $H_g^{-1}$; and a Hensel code result message recovery subsystem that computes a result message $m_r$ as Hensel Code Generation H with said prime $p_1$ and said result rational number $\alpha_r$ such that result message $m_r$ is equal to arithmetic function message $m_a$ o message $m_b$.

DETAILED DESCRIPTION OF THE EMBODIMENTS

1. Introduction

Figure 1:
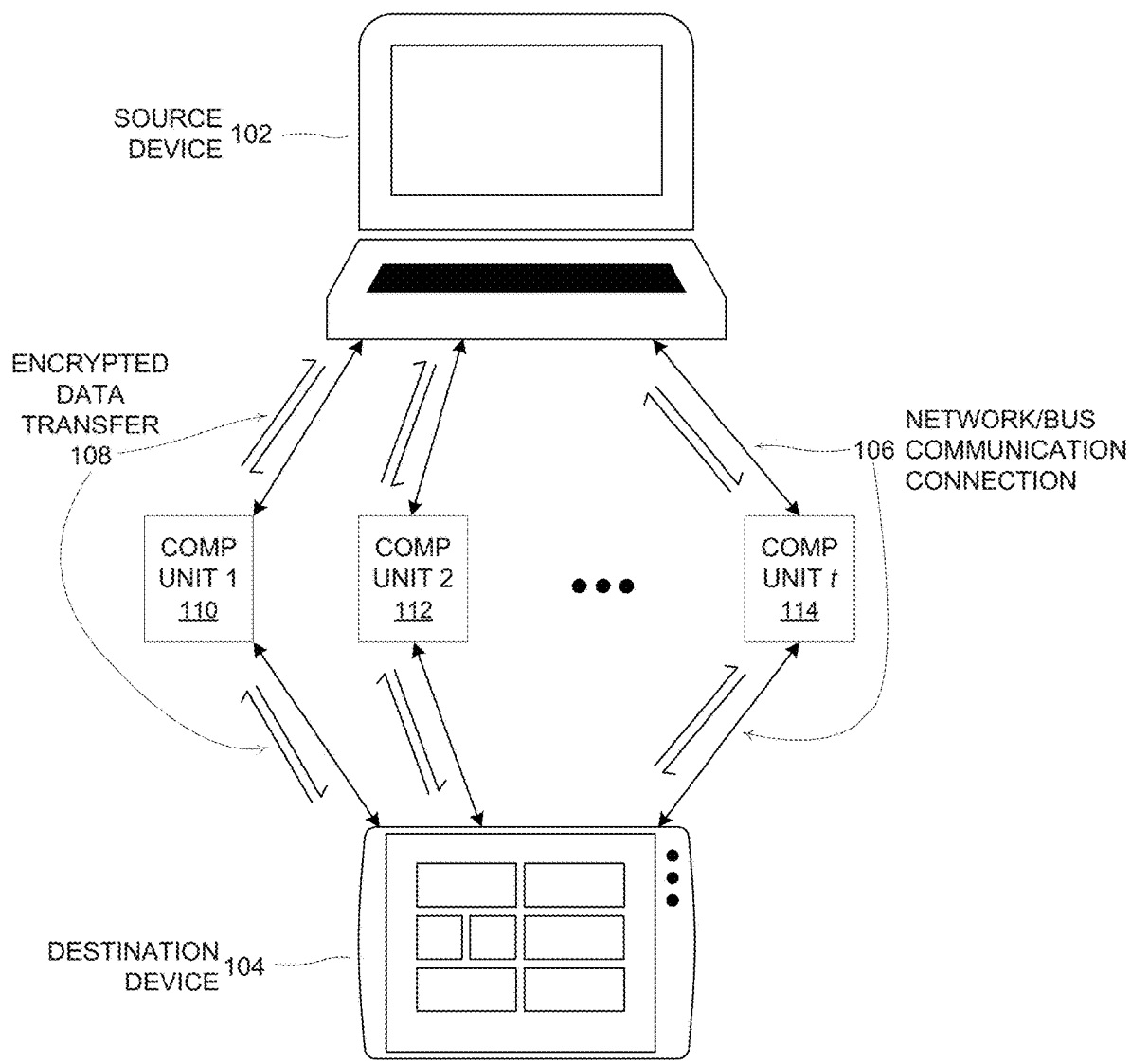
FIG. 1 is a block diagram of the hardware implementation for a Fully Homomorphic Encryption (FHE) system distributed computation embodiment.

The 1970s and 1980s were very important times for cryptography since it was during this particular period that most of the mathematical ideas for modern cryptography were established. In 1976, Diffie and Hellman proposed methods for key exchange and digital signatures in which the security is related to the discrete logarithm problem in finite fields. In 1978, Merkle introduced a method for secret key distribution based on randomized "puzzles.". Later in 1978 Rivest, Shamir and Adleman (RSA) introduced a method for obtaining digital signatures and public key cryptosystems, which was later referred to as the RSA cryptosystem, based on the factorization problem. Yet in 1978, McEliece proposed a public-key encryption scheme based on Goppa codes. As noted by Hellman, the aforementioned authors are considered the first publicly known proponents of public-key cryptosystems. Among these, the Diffie-Hellman key exchange and the RSA cryptosystem are of special relevance in the history of cryptography up to present time given they are not only two of the first public-key cryptosystems but also cryptosystems based on number theory. None of the aforementioned works proved secure. In fact, at that point in time, formal definitions of security were not yet in place and some of the schemes proposed (e.g., RSA) were actually demonstrably insecure. However, they are all relevant from a historical standpoint.

In 1985 Miller and in 1978 Koblitz, independently, proposed the use of elliptic curves in cryptography in which it is possible to construct cryptographic protocols based on the elliptic curve discrete logarithm problem. For this reason, it is possible to implement the ideas of Diffie and Hellman with elliptic curves, which is known as elliptic curve Diffie-Hellman, as well as providing a signature scheme with the elliptic curve digital signature algorithm. Many other protocols based on the discrete logarithm problem have been implemented with elliptic curves where all the solutions to cryptography that are based on elliptic curves are identified as elliptic curve cryptography (ECC).

In 1996, Ajtai introduced a class of random problems in lattice theory which are demonstrated to be difficult to solve based on the shortest vector problem, and in 1997 Ajtai and Dwork introduced a public-key cryptosystem based on lattices while showing that the average case of the problems showcased by Ajtai were as hard as the worst-case ones. In 1998 Hoffstein, Pipher and Silverman proposed lattice-ring-based public-key cryptosystem and in 2005 Regev introduced another public-key cryptosystem based on the problem of learning with errors, which can be related to lattice problems. Many authors found lattices a promising mathematical resource for constructing cryptographic solutions and soon enough the term lattice-based cryptography was adopted to identify the set of cryptographic solutions supported by lattice theory. In 2009 Gentry introduced the first fully homomorphic encryption scheme which was based on ideal lattices followed by several other lattice-based variants. As it happened with ECC, lattice-based cryptography is an active field of research.

As can be seen, elliptic curves and lattices are two examples of mathematical resources in which researchers encounter a vastness of opportunities for constructing cryptographic solutions to the extent of creating their own branch of research within cryptography. The various embodiments take advantage of another mathematical resource that is similarly rich, versatile, intuitive and powerful, namely, the p-adic number theory. Although p-adic numbers are somehow present in some cryptographic contexts, it has today a minor role when compared with p-adic number theory's potential of being a major field of research in cryptography. When proposing the use of elliptic curves in cryptography, Miller remarked that his intent was to "show that elliptic curves have a rich enough arithmetic structure so that they will provide a fertile ground for planting the seeds of cryptography." Analogously, the disclosure of the various embodiments is expected to show that p-adic numbers have a rich arithmetic structure to arouse a growing research interest on p-adic number theory's properties aimed at cryptographic constructions.

1.1 Our Contribution

We propose a modern, self-contained and minimum required elementary introduction to the p-adic number theory with emphasis in a distinct subset of properties and functions that we identify as valuable to cryptography. We provide efficient algorithms for the main mappings within the p-adic arithmetic alongside insights and practical examples of how to use them in the context of cryptography. We propose methods for allowing crypto algorithms over the integers to accept rational numbers. As we approach security concerns in cryptography via p-adic numbers, we introduce methods for adding randomness to deterministic crypto algorithms that can be easily extended to be able to randomize just about any deterministic algorithm. We propose a protocol for distributed computation where any input can be transformed into an arbitrary number of p-adic digits where number k of parties perform a joint computation, each one on their individual digit without having any knowledge of what that digit represents and what the other digits are. In a similar approach we propose methods for aiding parallel computation and we demonstrate how to parallelize a given function in terms of p-adic digits. By combining properties of our discussed constructions, we introduce a fully homomorphic encryption (FHE) scheme and we show its connection with the prime factorization and the discrete logarithm problem from a Hensel's lemma perspective.

1.2 Related Work

In 1817, Kurt Hensel introduced the p-adic number theory and since then it has been studied as part of Number Theory, however, it was only in the 1970s and 1980s that this branch of mathematics had any traction due to the work of Krishnamurthy, Rao, and Subramanian, and Alparslan when they found that the finite segment of the p-adic arithmetic was an efficient solution for error-free computation. During this period, other researchers became interested in error-free computation via p-adic numbers and helped to consolidate the finite segment p-adic number theory for practical applications in several areas of physics, engineering and computer science. The subject rapidly advanced with the contributions of Gregory, Beiser, Farinmade, Hehner and Horspool, and Lewis, among others. The practical implications of working with the finite p-adic arithmetic for error-free computation were so vast that Rao remarked that would not need to have a complete understanding of the theoretical aspects of p-adic numbers in order to work with its finite segment, since the theory of the finite segment p-adic had become a well-organized and a nearly self-sufficient subset of the theory of p-adic numbers. Krishnamurthy, Rao, and Subramanian named the finite-segment p-adic numbers as Hensel codes. Along-side with error-free computation, p-adic numbers have been successfully applied to parallel computation. The theory of p-adic numbers is currently present in many other theories, including the theory of dynamical systems, theoretical physics, number theory, algebraic geometry, non-Archemdian analysis, differential calculus, topology, and analytic functions.

2. p-adic Numbers

Let p be prime. Any positive integer x can be represented uniquely as an expansion of the form $x = a_0 + a_1 p + a_2 p^2 + \ldots + a_n p^n$ for some n, where $a_i$ is an integer with $0 \le a_i \le p$. That is, $a_0 + a_1 p + a_2 p^2 + \ldots + a_n p^n$ is the base-p representation of x. One of Hensel's main motivations was to relate the integers $\mathbb{Z}$ to the field of rationals $\mathbb{Q}$, which gives rise to the p-adic number system. In the p-adic number system, all rational numbers in the field of rational numbers $\mathbb{Q}$ are represented as unique infinite expansions $\alpha = a_i p^i$, where i is an integer and the value for any given $a_i$ is in the range $[0, p-1]$. In this work we focus our attention on the finite-segment p-adic number theory and from now on we discuss its foundation, main properties and opportunities for possible practical applications.

2.1 Hensel Codes

Gregory and Krishnamurthy remarked that there are a large number of ill-conditioned problems as well as numerically unstable algorithms in which cases rounding errors cannot be tolerated during computation. As one approach to solve this problem one might apply finite number systems (also known as residue number systems or RNS) in which one is able to perform computations free of rounding errors. The most common RNS number systems are probably the single-modulus and multiple-modulus. In this section we discuss another method to achieve error-free computation with truncated infinite p-adic expansions known as Hensel Codes (see Definition 3 below). Hensel's Lemma showed that increasing the number of terms in a p-adic expansion is equivalent to finding a unique integer root for a larger power of p. In the finite-segment p-adic number system, each rational number in a given finite set of $\mathbb{Q}$ is mapped to a unique integer root that will be referred to as an integer Hensel code. Computations performed over Hensel codes are mathematically equivalent to computations performed over their corresponding rational numbers, which was shown with infinite p-adic expansions; however, there are some special considerations to preserve uniqueness and correctness when working with the truncated expansions. The finite-segment p-adic arithmetic, as a type of RNS, is free of rounding errors.

Definition 1. A residue number system (RNS) is a numerical system in which an integer $x \in \{0, \ldots, M-1\}$, where $M = \prod_{i=1}^{k} m_i$, is uniquely represented in terms of its congruences with a set of k distinct and pairwise coprime moduli $\{m_1, \ldots, m_k\}$, which generate a set of k remainders $\{x_1, \ldots, x_k\}$ such that $x_i = x \bmod m_i$ and $0 \le x_i \le m_i$, for $i = 1 \ldots k$, such that there is a ring isomorphism guaranteed by the Chinese Remainder Theorem (CRT).

A p-adic expansion is a summation of the form $\sum_{i=k}^{\infty} \alpha_i p^i$, with $\alpha_i \in \{0, \ldots, p-1\}$. Any p-adic expansion naturally gives rise to the sequence of partial sums $(\alpha_n)$ where $\alpha_n = \sum_{k=k}^{n} m_i$. Note that this is always a Cauchy sequence with respect to the p-adic absolute value, and so every p-adic expansion can be said to converge to an element of p. A p-adic expansion is finite if it contains only a finite number of non-zero p-adic digits. Given a prime p, let an element h in $\mathbb{Z}_p$ that represents a rational $\alpha$ be a p-adic digit. In integer representation, if multiple primes are used to encode $\alpha$, say $(p_i, \ldots, p_k)$, then $\alpha$ is represented by multiple p-adic digits $(h_1, \ldots, h_k)$ where $h_i \in \mathbb{Z}_p$, $i = 1 \ldots k$.

Definition 2. For any prime p, the finite-segment p-adic number system is the replacement of the arithmetic over the rational numbers by the arithmetic over the integers modulo p.

Theorem 1. The finite-segment p-adic number system is a RNS (residue number system).

Proof. It is easier to prove the finite p-adic number system as a RNS for k p-adic digits where k≤1. However, we generalize it as follows: consider a k-digit Hensel code, for k≥1, and $g=\Pi_{i=1}^{i} p_i$. The Hensel code of a=a/b encoded with g is an integer x=ab$^{-1}$ mod g, for x∈{0, . . . , g−1}, such that each individual Hensel digit corresponding to each $p_i$ in g is computed as:

$$(h_1, \ldots h_k)=(x \bmod p_1, \ldots x \bmod p_k). \quad \text{Eq. 1}$$

For the particular case where k=1, it is obvious that h=x mod p.

Remark 1. Arithmetic in the finite-segment p-adic number system is equivalent to the single-modulus RNS if the single modulus is an integer of the form m=p$^r$ where p is a prime number and r is an arbitrary positive integer.

Definition 3. The r-order Hensel code of a rational number α is the truncation of the p-adic expansion of α to r digits. We write this as H (p, r, α).

Theorem 2 shows one approach for mapping to Hensel codes. The method finds the partial sum of an infinite p-adic expansion, converts it to radix-p form, and reverses the order of the digits.

Theorem 2. For all α=a/b in ℚ there is a n∈ℤ such that we can rewrite a/b as:

$$\frac{a}{b} = \frac{c}{d} p^n \quad \text{Eq. 2}$$

where gcd (c, d)=gcd (c, p)=gcd (d, p)=1. (gcd—greatest common denominator) We can then write the Hensel code for c/d as:

$$H(p,r,c/d)=a_0 a_1 \ldots a_{r-1}, \quad \text{Eq. 3}$$

where $\alpha_{r-1} \ldots a_0 a_1$ is the base p representation for the integer cd$^{-1}$ mod p$^r$. In other words, $$cd^{-1} \bmod p^r = a_0 + a_1 p + a_2 p^2 + \ldots \alpha_{r-1} p^{r-1}. \quad \text{Eq. 4}$$

Proof. Let c/d be computed by the following p-adic expansion:

$$\frac{c}{d} = \sum_{j=0}^{\infty} a_j p^j = (a_0 + a_1 p + \ldots + a_{r-1} p^{r-1}) + p^r R_r. \quad \text{Eq. 5}$$

Then we write c=d(a$_0$+a$_1$p+ . . . +α$_{r-1}$p$^{r-1}$)+p$^r$(dR$_r$). Then, $$c \bmod p^r = d(a_0 + a_1 p + \ldots + \alpha_{r-1} p^{r-1}) \bmod p^r, \quad \text{Eq. 6}$$

which implies:

$$cd^{-1} \bmod p^r = a_0 + a_1 p + \ldots + \alpha_{r-1} p^{r-1}, \quad \text{Eq. 7}$$

Example 1. Consider α=8/3∈ℚ, r=4, and p=5. Find the partial sum corresponding infinite p-adic expansion.

$$cd^{-1} \bmod p^r = 8 \cdot 3^{-1} \bmod 625 \quad \text{Eq. 8}$$
$$= 8 \cdot 417 \bmod 625.$$
$$= 3336 \bmod 625.$$
$$= 211$$

The sum of the truncated expansion is 211 in base 10, which is 1321 in base 5. Reversing the order of the digits and placing a p-adic point gives α=0.1231.

Example 2. Consider the two rational numbers α=¾ and β=381/76 mapped to ℚ$_3$. The Hensel codes with r=4 are given below.

$$H(p=3,r=4,\alpha=3^1(\tfrac{1}{4}))=3^1[(1\cdot 61)\bmod 81]=16 \quad \text{Eq. 9}$$

$$H(p=3,r=4,\beta=3^1(127/76))=3^1[(127\cdot 16)\bmod 81]=16 \quad \text{Eq. 10}$$

Verify, $$ad = cb \bmod p^r \quad \text{Eq. 11}$$
$$228 = 1524 \bmod 81 = 66$$

The resulting Hensel codes are identical, which illustrates that uniqueness is no longer valid for every a αℚ$_p$ in the finite-segment number system. As a result, a finite set of ℚ$_p$ is defined to ensure uniqueness and correctness for Hensel codes, and arithmetic on Hensel codes. The set of order-N Farey fractions, originally denoted by 𝔽$_N$, is classically defined in various texts. However, we propose new notation and a new definition for the order-N Farey fractions with respect to a prime p which is consistent with the applications of p-adic numbers throughout this work. But before introducing the new notation and new definitions we will discuss the basics of the mapping between order-N Farey fractions and Hensel codes over the integers.

2.2 Hensel Code Mappings Over the Integers

Section 2.1 showed two different methods for obtaining a Hensel code. In this section, we introduce the integer Hensel code, which is simply the partial sum of the truncated p-adic expansion. All previous examples with infinite p-adic expansions showed that given enough terms, the convergence for an expansion is found by arranging the terms as a geometric series. However, if enough terms are not given, a truncated p-adic expansion cannot be represented as a geometric series, which calls for an alternative method to solve for convergence of an integer Hensel code to the corresponding rational number in ℚ. The Extended Euclidean Algorithm (EEA) is one method to obtain the corresponding rational number.

From this point on, we will consider an isomorphic mapping between the order-N Farey fractions and a corresponding set of Hensel codes with respect to p$^r$ for r=1. Thus, we will suppress r in the notation for clarity. The reason for this decision will be discussed next.

Theorem 3. Given α=(regular a/b and p such that a, b, and p are pairwise coprime, and |a|, |b|<p there is a unique value of h=H (p, α), h<p which is computed as follows:

$$h=H(p,\alpha)=ab^{-1} \bmod p, \quad \text{Eq. 12}$$

where b$^{-1}$ is the modular multiplicative inverse of b with respect to p.

Proof. The computation of h as in Eq. 12 is fairly intuitive. Recall that any rational number a/b can be rewritten as a·b$^{-1}$=a·1/b. However, while working with arithmetic mod p, we compute a·b$^1$ mod p such that b$^{-1}$ is the only integer that satisfies b·b$^{-1}$ mod p=1. The value of a can be obtained from h by solving a=bh+kp, where k=(a−bh)/p. This is a Diophantine equation which can be solved by the EEA. We thus have a=bh+kp and b=(a−kp)/h and therefore h can be alternatively computed as h=(a−kp)/b.

Definition 4. A convergent is a rational number obtained via a limited number of terms in a continued fraction and it is typically denoted by $p_n/q_n$ for n convergents of a rational number x where $p_n/q_n$ is the n-th convergent of x.

Kraeft remarked that every irreducible rational number a/b which satisfies the inequality:

$$\left|\frac{c}{d} - \frac{a}{b}\right| < \frac{1}{2b^2} \qquad \text{Eq. 13}$$

is convergent of c/d.

Lemma 1. For all p/q, $x \in \mathbb{Q}$, if $$\left|x - \frac{p_n}{q_n}\right| \le \frac{1}{q_n q_{n+1}} < \frac{1}{q_n^2}, \qquad \text{Eq. 14}$$

then p/q is a convergent of x.

Proof. In order to find the distance between a convergent $$\frac{p_n}{q_n}$$

of a continued fraction and the fraction itself x, we begin by establishing, $$[a_0, a_1, \ldots, a_n] = a_0 + \cfrac{1}{a_1 + \cfrac{1}{a_2 + \ldots \cfrac{1}{a_n}}} \qquad \text{Eq. 15}$$

and $$p_0 = a_0, \quad q_0 = 1, \quad p_n = a_n p_{n-1} + p_{n-2} \qquad (16)$$
$$p_1 = a_1 a_0 + 1, \quad q_1 = a_1 \quad q_n = a_n q_{n-1} + q_{n-2}.$$

Thus, $$a_n = \frac{p_n}{q_n} = \begin{cases} a, & n = 0 \\ a_0 + \dfrac{1}{a_1}, & n = 1 \\ \dfrac{a_n p_{n-1} + p_{n-2}}{a_n q_{n-1} + q_{n-2}}, & n \ge 2 \end{cases} \qquad (17)$$

Every $a_n$ is a partial quotient of the continued fraction, which has a corresponding complete quotient $a'_n = a_n + \xi_n$ with $0 \le \xi_n < 1$. As a result, x can be represented as $$x = \frac{a'_{n+1} p_n + p_{n-1}}{a'_{n+1} q_n + q_{n-1}}.$$

Therefore, $$x - \frac{p_n}{q_n}$$

is:

$$x - \frac{p_n}{q_n} = \frac{a'_{n+1} p_n + p_{n-1}}{a'_{n+1} q_n + q_{n-1}} - \frac{p_n}{q_n} \qquad \text{Eq. 18}$$

$$= \frac{a'_{n+1} p_n q_n + p_{n-1} q_n}{q_n(a'_{n+1} q_n + q_{n-1})} - \frac{a'_{n+1} p_n q_n + p_n q_{n-1}}{q_n(a'_{n+1} q_n + q_{n-1})}$$

$$= \frac{p_{n-1} q_n - p_n q_{n-1}}{q_n(a'_{n+1} q_n + q_{n-1})}$$

Observe that $p_{n-1}q_n - p_n q_{n-1} = (-1)^n$, which can be verified with n=2. Therefore, $$x - \frac{p_n}{q_n} = \frac{p_{n-1}q_n - p_n q_{n-1}}{q_n(a'_{n+1}q_n + q_{n-1})} = \frac{(-1)^n}{q_n(a'_{n+1}q_n + q_{n-1})} \qquad \text{Eq. 19}$$

Let $q'_1 = a'_1$ and $q'_n = a'_n q_{n-1} + q_{n-2}$. Then, $$x - \frac{p_n}{q_n} = \frac{(-1)^n}{q_n(a'_{n+1}q_n + q_{n-1})} = \frac{(-1)^n}{q_n q'_{n+1}} \qquad \text{Eq. 20}$$

Notice that $q_n$ increases steadily as n increases, so $q_n > q_{n-1}$. Similarly, $q'_{n+1} \ge q_{n+1}$ because $q'_n = a'_n q_{n-1} + q_{n-2}$ and $q_n = a_n q_{n-1} + q_{n-2}$, where the complete quotient $a'_n$ is always greater than the partial quotient $a_n$. Then, the following inequalities can be defined.

$$q'_{n+1} \ge q_{n+1} > q_n \text{ and } \frac{1}{q'_{n+1}} \le \frac{1}{q_{n+1}} < \frac{1}{q_n}. \qquad \text{Eq. 21}$$

Finally, $$\left|x - \frac{p_n}{q_n}\right| = \frac{(-1)^n}{q_n q'_{n+1}} \le \frac{1}{q_n q_{n+1}} < \frac{1}{q_n^2}. \qquad \text{Eq. 22}$$

Example 3. Let $a_N = [1, 2, 3, 1]$, which gives the following values for $p_n$ and $q_n$.

$$p_0 = a_0 = 1 \qquad \text{Eq. 23}$$
$$q_0 = 1$$
$$p_1 = a_1 a_0 + 1 = 3$$
$$q_1 = a_1 = 2$$
$$p_2 = a_2 p_1 + p_0 = 10$$
$$q_2 = a_2 q_1 + q_0 = 7$$
$$p_3 = a_3 p_2 + p_1 = 13$$
$$q_3 = a_3 q_2 + q_1 = 9$$

and $$[1, 2, 3, 1] = 1 + \cfrac{1}{2 + \cfrac{1}{3 + \cfrac{1}{1}}} \qquad \text{Eq. 24}$$

which gives, $$a'_0 = 1 + \frac{1}{2},$$

$$a'_1 = 2 + \frac{1}{3}, \xi_0 = \frac{1}{2}$$

$$a'_2 = 3 + \frac{1}{1}, \xi_1 = \frac{1}{3}$$

$$a'_3 = \frac{1}{\xi_2} = 1, \xi_2 = \frac{1}{1}$$

Eq. 25

The distance between x and $$\frac{p_2}{q_2}$$

is:

$$\left| x - \frac{p_2}{q_2} \right| = \left| \frac{a'_3 p_2 + p_1}{a'_3 q_2 + q_1} - \frac{p_2}{q_2} \right|$$

$$= \left| \frac{13}{9} - \frac{10}{7} \right|$$

$$= \frac{1}{63}$$

Eq. 26

The inequality in Lemma 1 can be verified, where $$\frac{1}{q_2 q_3} = \frac{1}{63} \text{ and } \frac{1}{q_2^2} = \frac{1}{49}.$$

$$\left| x - \frac{p_2}{q_2} \right| = \frac{1}{63} \leq \frac{1}{q_2 q_3} < \frac{1}{q_2^2}$$

Eq. 26

Theorem 4. If given α=a/b, we compute h=ab⁻¹ mod p, where 0≤|a|≤N, 0≤|b|≤p/(N+1) for N=⌊√p/2⌋, then, since the EEA applied to p and h computes all the convergents of h/p, α is set to be the i-th convergent $a_i/y_i$ of h/p. We write this as a=H⁻¹(p, h).

Proof. We can rearrange h=ab⁻¹ mod p as a modular equation:

$$hb - a \equiv 0 \mod p$$

Eq. 28

The aim is to show that −k/b is a convergent of h/p by rearranging $$\left| h - \frac{a}{b} \right| \text{ as } \frac{a}{bp} = \frac{h}{p} - \frac{k}{b} \cdot hb - a$$

is congruent to 0 and therefore a multiple k of p. Thus, $$hb - a = kp \text{ and } a = hb - kp$$

Eq. 29

Then, dividing both sides by bp gives:

$$\frac{a}{bp} = \frac{h}{p} - \frac{k}{b}$$

Eq. 30

By applying Lemma 1 we can prove that −k/b is a convergent of h/p by satisfying $$\left| \frac{h}{p^r} - \frac{k}{b} \right| < \frac{1}{b^2}$$

Eq. 31 and it can be computed by the algorithm that computes all the convergents, the EEA. Then the value a/b can be obtained by EEA as $a_i/y_i$ for the i such that $|y_i| \leq N$.

Definition 5. Let $\mathbb{C}_{h/p}$ denote the set of all convergents of h/p such that:

$$\mathbb{C}_{h/p} = \left\{ a/b \,\bigg|\, \left| \frac{h}{p} - \frac{k}{b} \right| < \frac{1}{b^2}, k = (bh - a)/p \right\}$$

Eq. 32

Lemma 2. If r=1, given α=a/b and a prime number p, where a, b, p are pairwise coprime, the Hensel code h of α computed as h=ab⁻¹ mod p, then h is the zeroth term of the finite expansion that computes α.

Proof. Given α=a/b, we have ba0=a mod p, thus, the solution for $a_0$=ab⁻¹ mod p=h.

We compute Theorem 4 via a modified version of the EEA (MEEA), which is given in Algorithm 1.

---

Algorithm 1: (MEEA) α = H⁻¹ (p, h)
 Input: p, h;
 Output: α such that h = H (p, α)
 $a_0$ = p, $a_1$ = h; $y_0$ =0, $y_1$ =1; i = 1; N = ⌊√p/2⌋
 while $a_i$ > N do
  q = ⌊$a_{i-1}/a_i$⌋;
  $a_{i+1}$ = $a_{i-1}$ − q · $a_i$;
  $y_{i+1}$ = $y_{i-1}$ + q · $y_i$;
  i = i + 1;
 end
 α = ((−1)^{i+1} · $a_i$)/$y_i$;
 Result: α

---

Example 4. Let h=97, p=241. We calculate α=H⁻¹(p, h) as follows:

$$a_0=p=241, a_1=h=97, y_0=0, y_1=1, i=1.$$

Eq. 33

In the second iteration, we have:

$$q=\lfloor a_0/a_1 \rfloor=2, a_2=a_1-q \cdot a_0=47, y_2=y_1-q \cdot y_0=2, i=2$$

Eq. 34 and therefore:

$$q=\lfloor a_1/a_2 \rfloor=2, a_3=a_2-q \cdot a_1=3, y_3=y_2-q \cdot y_1=5, i=3,$$

Eq. 35 and therefore:

$$c=(-1)^{i+1} \cdot a_i, d=y_i.$$

Eq. 36

The result is then given by α=c/d=3/5

Remark 2. Algorithm 1 computes all the convergents $a_i/y_i$ of h/p until finding the first convergent that satisfies $$|a_i| \leq N, |y_i| \leq \left\lfloor \frac{p}{N+1} \right\rfloor, N = \lfloor \sqrt{p/2} \rfloor.$$

Theorem 5. Algorithm 1 runs in O (log N).

Proof. Algorithm 1 is a modified EEA and this modification is solely on the setup of the inputs and the presentation of the results. Its complexity its truly defined by the while loop that computes all the convergents of h/p which is bounded by N and the complexity of the bounded computation of all convergents by the EEA is O (log N).

2.3 Order-N Farey Fractions

There are some additional properties of the set of order-N Farey fractions that are worth discussing. In this section we provide some insights on the mapping between those fractions and their corresponding Hensel codes which will be relevant in understanding why this relationship can be useful for cryptography.

Recall that a prime number p encodes p order-N Farey fractions, each one with their unique corresponding integer from the set $\mathbb{Z}_p=\{0, \ldots, p-1\}$. But what does N represent in terms of the mapping between order-N Farey fractions and their Hensel codes? We present some observations that we consider important in understanding this connection. We introduce Example 5 to illustrate that the order-N Farey fractions have 2N+1 integers and p−(2N+1) non-integer fractions. This metric is used in Theorem 8. Example 5 aims to assist the understanding that N determines the number of non-zero integer fractions allowed in the set, and by allowing zero, positive and negative integers, we have 2N+1.

Example 5. If $p_1=17$, then $N=\lfloor\sqrt{17/2}\rfloor=2$, and $p_1$ encodes 17 order-N fractions with 17 integer Hensel codes, as we can see below:

$$\begin{array}{llllll}
0/1 & \to 0, 1/1 & \to 1, 2/1 & \to 2, -2/5 & \to 3, & \text{Eq. 37}\\
-1/4 & \to 4, -2/3 & \to 5, 1/3 & \to 6, 1/5 & \to 7, \\
-1/2 & \to 8, 1/2 & \to 9, -1/5 & \to 10, -1/3 & \to 11, \\
2/3 & \to 12, 1/4 & \to 13, 2/5 & \to 14, -2/1 & \to 15, \\
-1/1 & \to 16.
\end{array}$$

We observe that in the set of order-N Farey fractions in (37), there are 2N+1=5 integers and $p_1-(2N+1)=17-5=12$ non-integer fractions. If $p_2=13$, then $N=\lfloor\sqrt{13/2}\rfloor=2$, and $p_2$ encodes 13 order-N fractions with 13 integers, as we can see below:

$$\begin{array}{llllll}
0/1 & \to 0, 1/1 & \to 1, 2/1 & \to 2, -1/4 & \to 3, & \text{Eq. 38}\\
-1/3 & \to 4, 2/3 & \to 5, -1/2 & \to 6, 1/2 & \to 7, \\
-2/3 & \to 8, 1/3 & \to 9, 1/4 & \to 10, -2/1 & \to 11, \\
-1/1 & \to 12.
\end{array}$$

Similarly, we observe that in the set of order-N Farey fractions in (38), there are 2N+1=5 integers and $p_2-(2N+1)$ non-integer fractions.

Notice in Example 5 that $p_1$ and $p_2$ share the same N, which indicates that their corresponding set of order-N Farey fractions have the same number of integers, with, however, different number of non-integer Farey fractions. Notice also that in Algorithm 1, we only compute the convergents while the numerator is greater than N for a given prime p and Hensel code h.

Lemma 3. Given an odd prime p, $N=\lfloor\sqrt{p/2}\rfloor$, and the Hensel codes $h_\alpha, h_\beta \in \mathbb{Z}_p$ where $h_\alpha=H(p, \alpha)$, $h_\beta=H(p, \beta)$, and $\alpha$ and $\beta$ are integers, for all $h_\alpha \leq N$, it holds that $H^{-1}(p, h_\alpha)=\alpha=h_\alpha$ and for all $h_\beta>N$ it holds that $H^{-1}(p, h_\beta)=\beta\neq h_\beta$.

Proof. The modified EEA in Algorithm 1 is committed to compute all the convergents of a Hensel code h with respect to a prime p while $a_i>N$ for $N=\lfloor\sqrt{p/2}\rfloor$. Any Hensel code less than or equal to N will decode to a rational $\alpha=h$ since the setup of the algorithm defines $a_0=p$ and $a_1=h$. Thus, it is clear that if h is not greater than N, then the iterations that computes the convergents are never calculated and the result is guaranteed to be an integer since we defined $y_1=1$. With i=1, then it is guaranteed that $$\frac{(-1)^{1+1}\cdot a_1}{y_1}=h.$$

Conversely, if $a_i$ is indeed greater than N, this means that a convergent will be computed and a non-integer fraction will be output by the algorithm. Since Lemma 3 specifies that input order-N Farey fractions are integers, it is clear that whenever $a_i>N$, the resulting fraction $\alpha$ is not equal to its corresponding Hensel code h.

Corollary 1. In all sets of order-N Farey fractions, there are N+1 non-negative integers which the corresponding Hensel codes are equal to the original fractions.

Corollary 2. A Hensel code h decoded with two distinct primes $p_1$ and $p_2$ will only result in the same order-N Farey fraction $\alpha$ if $\alpha\in\mathbb{Z}$, $a\leq N$ and $N=\lfloor\sqrt{p_1/2}\rfloor=\lfloor\sqrt{p_2/2}\rfloor$.

Theorem 6. For all Hensel code h such that $p-N\leq h<p$ where $N=\lfloor\sqrt{p_2/2}\rfloor$ it holds that the order-N Farey fraction $\alpha$ associated with h is a negative integer in $\{-N, \ldots, -1\}$. We write $H^{-1}(p, h)=-x$, $x\in\{1, \ldots, N\}$.

Proof. The modified EEA in Algorithm 1 defines $a_0=p$ and $a_1=h$. If $N\leq h\geq p-N$, then $a_1>N$. In the first iteration, q is defined as $q=\lfloor a_0/a_1\rfloor$, with for $h\geq p-N<p$ will be always equal to 1. Then, we compute $a_2$ as $a_2=a_0-qa_1$, which for $h\geq p-N<p$ it holds that $a_2\leq N$. Thus, there are no more iterations. Since $q=1$, $y_2$ is computed as $y_2=y_0+q\cdot y_1$. Recall that in Algorithm 1, we start by defining $y_0=0$ and $y_1=1$. Thus, it holds that $y_2=1$. Since by the end of the first iteration i=2, then $((-1)^{2+1}\cdot a_2)/y_2=-x$, $x\in\{1, \ldots, N\}$.

Theorem 7. For all prime p, there are p Hensel codes to encode p order-N (irreducible) Farey fractions where $N=\lfloor\sqrt{p/2}\rfloor$, which is composed by 2N+1 integers (fractions with one as the denominator) and p−(2N+1) non-integer fractions.

Proof. For all prime p and $N=\lfloor\sqrt{p/2}\rfloor$, Corollary 1 states that there are N+1 positive integer order-N Farey fractions in $\mathbb{F}_N$ and Theorem 6 states that there are N negative integer Farey fractions in $\mathbb{F}_N$, which gives a total of 2N+1 integers order-N Farey fractions in $\mathbb{F}_N$. The non-integer Farey fractions are then given by p−(2N+1).

We are now ready to formally state a new definition and notation for the set of order-N Farey fractions with respect to a prime p.

Theorem 8. For all prime p and $a/b\in\mathbb{Q}_p$, the set of order-N Farey fractions $\mathbb{F}_p$, where N is given by $N=\lfloor\sqrt{p/2}\rfloor$.

$$\mathbb{F}_p = \left\{\begin{array}{l} gcd(a, b) = gcd(a, p) = gcd(b, p) = 1 \\ \text{and } \frac{a}{b} \text{ is the first convergent in } \mathbb{C}_{h/p} \text{ such that} \\ 0 \leq |a| \leq N, 0 < |b| \leq \lfloor p/(N+1)\rfloor \end{array}\right. \quad \text{Eq. 39}$$

Proof. Lemma 3 states that all Hensel codes $h\leq N$ will decode to an order-N Farey fraction $\alpha=h$ and Theorem 6 states that all Hensel codes $N\leq h\geq p-N<p$ will decode to an order-N Farey fraction $\alpha$ that is a negative integer in the set $\{-N, \ldots, -1\}$. Thus, the first N+1 elements of $\mathbb{F}_p$ are non-negative integers and the last N elements of $\mathbb{F}_p$ are negative integers. Thus, it is clear that the last non-integer element of $\mathbb{F}_p$ is the one which the corresponding Hensel code is h=p−(N+1). Given this Hensel code h, the setup of Algorithm 1 sets as initial values $a_0$=p, $a_1$=p−(N+1) and $y_0$=0, $y_1$=1. Then, in the first iteration, for all prime p that generates sets $\mathbb{F}_p$ with at least one non-integer fraction (e.g., p≥5), the result of q=$a_0$/$a_1$=⌊p/p−(N+1)⌋ will always be 1. Then, $$a_2=p-(p-(N+1))=N+1$$

$$y_2=0+1\cdot 1=1 \qquad \text{Eq. 40}$$

In the next iteration, we compute q, $a_3$ and $y_3$ as:

$$q=\lfloor a_1/a_2 \rfloor=\lfloor (p-(N+1))/(N+1)\rfloor$$

$$a_3=a_1-q\cdot a_2=(P-(N+1)-\lfloor(p-(N+1))/(N+1)\rfloor\cdot(N+1)$$

$$y_3=y_1+q\cdot y_2=1+\lfloor(p-(N+1))/(N+1)\rfloor\cdot 1=\lfloor p/(N+1)\rfloor \qquad \text{Eq. 41}$$

Since $a_3$ is not greater than N, the algorithm stops and the denominator of the solution is given by $y_3$.

2.4 Ring Isomorphism of Order-N Farey Fractions

The order-N Farey fractions $\mathbb{F}_p$, in which the elements are scoped as stated in Theorem 8, is a set equipped with two binary operations, addition and multiplication, where $\mathbb{F}_p$ is associative and commutative under addition, and have an additive inverse and additive identity, and is associative and distributive under multiplication, and has a multiplicative identity. All non-zero elements of $\mathbb{F}_p$ has a multiplicative inverse. Addition and multiplication in $\mathbb{F}_p$ are defined as follows:

$$\alpha+\beta \in \mathbb{F}_p = H^{-1}(p, H(p,\alpha+\beta)) \qquad \text{Eq. 42}$$

$$\alpha\beta \in \mathbb{F}_p = H^{-1}(p, H(p,\alpha\beta))$$

Therefore, $\mathbb{F}_p$ is a commutative ring. We want to show that $\mathbb{F}_p$ is isomorphic with Zp. In Theorem 3 we showed that the function H uniquely and correctly maps elements of $\mathbb{F}_p$ to elements of $\mathbb{Z}_p$ and in Theorem 4 we showed that the function $H^{-1}$ uniquely and correctly maps elements of $\mathbb{Z}_p$ to elements of $\mathbb{F}_p$. Now we show the ring isomorphism between $\mathbb{F}_p$ and $\mathbb{Z}_p$ by further examining addition and multiplication.

Lemma 4. For all $\alpha, \beta \in \mathbb{F}_p$ the following holds:

$$H(p,\alpha+\beta)=H(p,\alpha)+H(p,\beta)$$

$$\alpha+\beta=H^{-1}(p,H(p,\alpha+\beta)) \qquad \text{Eq. 43}$$

Proof. Given $\alpha$=a/b, $\beta$=c/d $\in \mathbb{F}_p$, recall that each Hensel code h=$ab^{-1}$ mod p can be rewritten as a diophantine equation so we can write the Hensel code of $\alpha$, $\beta$, respectively, as:

$$h_\alpha=(a-k_\alpha p)/b$$

$$h_\beta=(c-k_\beta p)/d \qquad \text{Eq. 44}$$

where $k_\alpha$, $k_\beta$ are given by:

$$k_\alpha=(a-bh)/p$$

$$k_\beta=(c-dh)/p \qquad \text{Eq. 45}$$

Then, we can write the following:

$$H(p,\alpha)+H(p,\beta)=\frac{a}{b}+\frac{c}{d}-\frac{pk_\alpha}{b}-\frac{pk_\beta}{d}=h_{\alpha+\beta} \qquad \text{Eq. 46}$$

We compute $k_{\alpha+\beta}$ as:

$$k_{\alpha+\beta}=ad+bc-bd\frac{\left(\frac{(a-k_\alpha p)}{p}+\frac{(a-k_\beta p)}{d}\right)}{p} \qquad \text{Eq. 47}$$

which allows us to obtain the numerator and denominator of a/b+c/d which is given by computing $H^{-1}(p, \alpha+\beta)$ and we verify that:

$$ad+bc=bdh_{\alpha+\beta}+k_{\alpha+\beta}p \qquad \text{Eq. 48}$$

$$bd=\frac{(ad+bc)-k_{\alpha+\beta}p}{h_{\alpha+\beta}}$$

Thus, $$H^{-1}(p, h_{\alpha+\beta})=(ad+bc)/bd=\alpha+\beta \qquad \text{Eq. 49}$$

Lemma 5. For all $\alpha, \beta \in \mathbb{F}_p$ the following holds:

$$H(p,\alpha\beta)=H(p,\alpha)H(p,\beta)$$

$$\alpha\beta=H^{-1}(p,H(p,\alpha\beta)) \qquad \text{Eq. 50}$$

Proof. For $\alpha$=a/b, $\beta$=c/d $\in \mathbb{F}_p$, once again we have:

$$H(p,\alpha)=h_\alpha=(a-k_\alpha p)/b$$

$$H(p,\beta)=h_\beta=(c-k_\beta p)/d \qquad \text{Eq. 51}$$

where $$k_\alpha=(a-bh)/p$$

$$k_\beta=(c-dh)/p \qquad \text{Eq. 52}$$

Then we can write the following:

$$H(p,\alpha)H(p,\beta)=\frac{(a-k_\alpha p)(c-k_\beta p)}{bd}=h_{\alpha\beta} \qquad \text{Eq. 53}$$

We compute $k_{\alpha\beta}$ as follows:

$$k_{\alpha\beta}=\frac{(ac-(a-k_\alpha p)(c-k_\beta p)}{p} \qquad \text{Eq. 54}$$

which allows us to obtain the numerator and denominator of a/b·c/d which is given by computing $H^{-1}(p, \alpha\beta)$ and we verify that:

$$ac=bdh_{\alpha\beta}+k_{\alpha\beta}p \qquad \text{Eq. 55}$$

$$bd=\frac{ac-k_{\alpha\beta}p}{h_{\alpha\beta}}$$

Thus, $$H^{-1}(p, h_{\alpha\beta})=ac/cd=\alpha\beta \qquad \text{Eq. 56}$$

We define the modulo p operation on elements of $\mathbb{Q}$ as follows:

$$\alpha \bmod p=H^{-1}(p,H(p,\alpha)), \alpha \in \mathbb{F}_N. \qquad \text{Eq. 57}$$

Example 6. Let p=83, and a/b=c/d=5/6 $\in \mathbb{F}_N$. We show that the product:

$$5/6 \cdot 5/6 = 25/36, \qquad \text{Eq. 58}$$

corresponds to:

$$H\left(p, \frac{5}{6} \cdot \frac{5}{6}\right) = H\left(p, \frac{25}{36}\right) = 25 \cdot (36)^{-1} = 25 \cdot 30 = 3 \mod 83. \qquad \text{Eq. 59}$$

It is easy to verify that since $$H\left(p, \frac{5}{6}\right) = 70,$$

then:

$$70 \cdot 70 = 3 \mod 83. \qquad \text{Eq. 60}$$

Example 7. Let $p=83$, and $a/b=c/d=6/11 \in \mathbb{F}_N$. We show that the sum:

$$6/11 + 6/11 = 12/11, \qquad \text{Eq. 61}$$

corresponds to:

$$H\left(p, \frac{6}{11} + \frac{6}{11}\right) = H\left(p, \frac{12}{11}\right) = 12 \cdot (11)^{-1} = 12 \cdot 68 = 69 \mod 83. \qquad \text{Eq. 62}$$

It is easy to verify that since $$H\left(p, \frac{6}{11}\right) = 76,$$

then:

$$76 + 76 = 69 \mod 83. \qquad \text{Eq. 63}$$

Example 8. What if the computations on elements in $\mathbb{F}_p$ produce a very large result which is way far from $\mathbb{F}_p$? We show that the result, no matter what it is, is congruent modulo p. Let $p=83$, and $a/b=5/9$. Then, we show that the following holds:

$$H(83, 5/9 \cdot 5/9 \cdot 5/9) = H\left(p, \frac{5}{9}\right) \cdot H\left(p, \frac{5}{9}\right) \cdot H\left(p, \frac{5}{9}\right) \qquad \text{Eq. 64}$$

where the computation with Hensel codes is reduced modulo 83. We see that:

$$H(83, 5/9 \cdot 5/9 \cdot 5/9) = H(83, 5^3/9^3) = 53 \qquad \text{Eq. 65}$$

and since $$H(83, 5/9) = 19 \qquad \text{Eq. 66}$$

then, $$19^3 = 53 \mod 83. \qquad \text{Eq. 67}$$

Theorem 9. For any given prime p, there is a ring isomorphism between $\mathbb{F}_p$ and $\mathbb{Z}_p$.

Proof. According to Theorems 3 and 4, the function H correctly and uniquely maps each member of $\mathbb{F}_p$ to a member of $\mathbb{Z}_p$ as well as the function $H^{-1}$ correctly and uniquely maps each member of $\mathbb{Z}_p$ to a member of $\mathbb{F}_p$. Lemmas 4 and 5 show that H and $H^{-1}$ preserve this correspondence over addition and multiplication. Thus, there is a one-to-one and onto correspondence between $\mathbb{F}_N$ and $\mathbb{Z}_p$.

2.5 g-adic Numbers

Definition 6. Let g be a positive integer which is written as the product of k distinct primes such that $g = \prod_{i=1}^{k} p_i$. A g-adic number has a unique expansion of the form $x = a_0 + a_1 g + a_2 g^2 + \ldots$, where $a_0 \neq 0$ and $0 \leq a_i \leq g$. If we let $a_0 + a_1 g + \ldots + a_i g^i$, then the expansion of a rational number a/b can be computed in terms of g as long as a, b and g are pairwise coprime.

Definition 7. g-adic number forward map Given k distinct prime numbers $p_1, \ldots, p_k$, for $k \geq 1$, and a rational number a/b such that:

$$\mathbb{F}_g = \qquad \text{Eq. 68}$$

$$\begin{cases} \gcd(a, b) = \gcd(a, g) = \gcd(b, g) = 1 \\ a/b \in \mathbb{Q}_g \mid \text{and } a/b \text{ is the first convergent in } \mathbb{C}_{h/g} \text{ such that} \\ 0 \leq |a| \leq N, 0 < |b| \leq \lfloor g/(N+1) \rfloor \end{cases}$$

where $$N = \lfloor \sqrt{g/2} \rfloor, g = \prod_{i=1}^{k} p_i, \qquad \text{Eq. 69}$$

the k-digit Hensel code forward mapping is calculated as follows:

$$(h_1, \ldots, h_k) = H_g((p_1, \ldots, p_k), a/b) \qquad \text{Eq. 70}$$

$$= (H(p_1, a/b), \ldots, H(p_k, a/b))$$

We write $(h_1, \ldots, h_k) = H_g((p_1, \ldots, p_k), a/b)$.

Example 9. Given $p_1=241$, $p_2=251$, $p_3=281$, $a/b=3/5$, the multiple direct Hensel code mapping is calculated as follows:

$$(h_1, \ldots, h_k) = H_g((p_1, \ldots, p_k), a/b) \qquad \text{Eq. 71}$$

$$= H_g((241, 251, 281), 3/5)$$

$$= (97, 101, 113)$$

In order to define the g-adic number inverse map we introduce Lemma 6.

Lemma 6. Given an order-N Farey fraction $\alpha$, k primes $p_1, \ldots, p_k$ and $g = \prod_{i=1}^{k} p_i$, the k-digit Hensel code $(h_1, \ldots, h_k) = H_g((p_1, \ldots, p_k), a)$ and the single digit Hensel code $h = H(g, a)$ are equivalent since they represent the same quantity $\alpha$.

Proof. The single most relevant property in any prime p for being used to compute Hensel codes for order-N Farey fractions $\alpha$ is that p does not share any common divisor greater than 1 with any number less than p and therefore a modular multiplicative inverse of any number less than p and p is guaranteed to exist. Given k primes $p_1, \ldots, p_k$, the k-digit Hensel code of $a = a/b$ is computed as $(H(p_1, \alpha), \ldots, H(p_k, \alpha))$. Since the Hensel code direct mapping requires a, b and each $p_i$ to be pairwise coprime and each Hensel code digit $h_i$ is less than each corresponding $p_i$, it is guaranteed that $\gcd(a, g) = \gcd(b, g) = 1$ for $g = \prod_{i=1}^{k} p_i$. If we compute $(h_1, \ldots, h_k) = H_g((p_1, \ldots, p_k), \alpha)$, we verify that:

$$\sum_{i=1}^{k} \frac{g}{p_i}\left(\left(\frac{g}{p_i}\right)^{-1} \bmod p_i\right) h_i \bmod g = ab^{-1} \bmod g \qquad \text{Eq. 72}$$

and thus $H_g((p_1, \ldots p_k), \alpha) \equiv H(g, \alpha)$.

Example 10. Let $p_1=241$, $p_2=251$, $p_3=257$, $g=241 \cdot 251 \cdot 257=15546187$ and $a=3/5$. We compute the 3-digit Hensel code for a as follows:

$$(97,101,52) = H_g((241,251,257), 3/5) \qquad \text{Eq. 73}$$

By computing the left-hand side of Eq. 72 we have:

$$(64507 \cdot 119 \cdot 97 + 61937 \cdot 46 \cdot 101 + 60491 \cdot 83 \cdot 52)$$
$$= 1293442759 \qquad \text{Eq. 74}$$

and $$1293442759 \bmod g = 1293442759 \bmod 15546187 = 3109238 \qquad \text{Eq. 75}$$

By computing the right-hand side of Eq. 72 we have:

$$3 \cdot 5^{-1} \bmod 15546187 = 3 \cdot 6218475 \bmod 15546187 = 3109238 \qquad \text{Eq. 76}$$

which is compliant with Eq. 72.

Definition 8. g-adic number inverse map Given k distinct odd prime numbers $p_1, \ldots, p_k$, and a k-digit Hensel code $(h_1, \ldots, h_k)$, the corresponding rational number $a/b$ is calculated as follows:

$$z = \sum_{i=1}^{k} \frac{g}{p_i}\left(\left(\frac{g}{p_i}\right)^{-1} \bmod p_i\right) h_i \bmod g \qquad \text{Eq. 77}$$

where z is computed via the CRT, $g = \Pi_{i=1}^{k} p_i$, and the result $a/b$ is computed as $$\frac{a}{b} = H^{-1}(g, z).$$

We write $a/b = H_g^{-1}((p_i, \ldots, p_k), (h_1, \ldots h_k))$.

Example 11. Given $p_1=241$, $p_2=251$, $p_3=281$ and the Hensel codes $h_1=97$, $h_2=101$, $h_3=113$, we calculate the corresponding rational number $a/b$ as follows:

$$z = \sum_{i=1}^{2} \frac{g}{p_i}\left(\left(\frac{g}{p_i}\right)^{-1} \bmod p_i\right) h_i \bmod g \qquad \text{Eq. 78}$$
$$= 6799189$$

and $$a/b = H^{-1}(g, z) \qquad \text{Eq. 79}$$
$$= H^{-1}(16997971, 6799189)$$
$$= 3/5$$

Theorem 10. Let $(p_1, \ldots, p_k)$ be k distinct primes, and $N = \lfloor \sqrt{g/2} \rfloor$. A k-digit Hensel code encoded in terms of $(p_1, \ldots, p_k)$ is equivalent to a single digit Hensel code encoded in terms of g.

Proof. Given k primes $(p_i, \ldots, p_k)$, $N = \lfloor \sqrt{b/2} \rfloor$, $g = \Pi_{i=1}^{k} p_i$, a rational number $a/b$ where a, b, g are pairwise coprimes and a k-digit Hensel code $(h_1, \ldots, h_k) = H_g((p_1, \ldots, p_k), a/b)$, it holds that:

$$\sum_{i=1}^{k} \frac{g}{p_i}\left(\left(\frac{g}{p_i}\right)^{-1} \bmod p_1\right) h_i \bmod g. \qquad \text{Eq. 80}$$

It is easy to see that (80) holds if we have a single prime and $g=p$. Then mod $$\frac{g}{p_i}\left(\left(\frac{g}{p_i}\right)^{-1} \bmod p_i\right) = 1$$

and we gave h mod g left, since we have a single code for a single prime. Thus, $ab^{-1} \bmod g$. Another way to see this equivalence is by inspecting the g-adic number inverse map in Definition 8. The first of decoding a k-digit Hensel code is to compute z in Eq. 77. Then, z is decoded as a single Hensel code in terms of g and it is clear that:

$$H(g, a/b) = \sum_{i=1}^{k} \frac{g}{p_i}\left(\left(\frac{g}{p_i}\right)^{-1} \bmod p_i\right) h_i \bmod g. \qquad \text{Eq. 81}$$

Example 12. Let $k=4$, $(p_1, p_2, p_3, p_4) = (17, 23, 37, 41)$, $g = \Pi_{i=1}^{k} p_i = 593147$ and $a/b = 25/11$. The 4-digit Hensel code for 25/11 is given by:

$$H_g((17,23,37,41), 25/11) = (10, 19, 9, 6). \qquad \text{Eq. 82}$$

In order to decode (10, 19, 9, 6) back to $a/b$, according to Definition 8, the first step is to compute z via CRT:

$$z = 34891 \cdot 5 \cdot 10 + 25789 \cdot 4 \cdot 19 + 16031 \cdot 26 \cdot 9 + 14467 \cdot 34 \cdot 6 = 323537, \qquad \text{Eq. 83}$$

and we check that:

$$H\left(g, \frac{a}{b}\right) = H\left(593147, \frac{25}{11}\right) = 323537. \qquad \text{Eq. 84}$$

Theorem 11. A rational number $a/b$ encoded with k distinct primes $(p_1, \ldots, p_k)$ must result in k distinct Hensel digits if $a/b$ is not a positive integer.

Proof. Since a, b and $p_i$, for $i=1 \ldots k$ are all pairwise coprime, the only way to have non-distinct Hensel digits in $(ab^{-1} \bmod p_i, \ldots, ab^{-1} \bmod p_k)$ is if $0 \le a \le p_i$ (for all i) and $b=1$, which indicates that $a/b$ is a positive integer. If $a \ge 0$ and $b>0$, $b \ne 1$, then the modular multiplicative inverse of b with respect to $p_i$ is unique, which will result in k distinct Hensel digits. If $a<0$ and $b=1$, which indicates that $a/b$ is a negative integer, the modular additive inverse of a with respect to $p_i$ is also unique, resulting in k distinct Hensel digits.

3. Encrypting Rational Numbers

The theory of p-adic numbers is sometimes referred as a theory of representation, mostly for its ability of consistently replacing the arithmetic over rational numbers by the arithmetic over the integers. In some applications, critical data are often represented as fractions, as it is the case of machine learning, where some data need to be normalized and then taken the standard deviation, production values within, say, 0 and 1. In this section we want to demonstrate that some well-known cryptosystems can be slightly modified to include rational numbers in the set of its inputs without adding extra variables or compromising existing homomorphic properties, as it is the case of RSA.

3.1 RSA with Rational Numbers

The RSA cryptosystem can be summarized as follows: given a public key e and two secret prime numbers p and q, a public key n is computed such that n=pq and the private keys $\phi(n)$ and d are computed such that $\phi(n)=(p-1)(q-1)$ and $d=e^{-1} \bmod \phi(n)$, i.e., $ed=1 \bmod \phi(n)$. Given a message m, a ciphertext c is computed such that $c=m^e \bmod n$. The message m can be retrieved from c such that $m=c^d \bmod n$. This is known as the "naive" RSA signatures, which is sufficient for this particular discussion, since we are addressing an extension of RSA's utility without affecting its security. For the secure versions of RSA discussed by Katz and Lindell, such as RSA PKCS and RSA-OAEP, we propose the same basic approach that will be discussed next, that, to consider the message m a rational number and replace it by its corresponding Hensel code h.

RSA operates over the integers. If one wants to use RSA to encrypt any data that is not in integer form, then a mapping from any other format to integer form is required. We show that Hensel codes can be used to solve this problem without compromising RSA properties.

Definition 9. Hensel codes with single existing prime Let $\mathbb{F}_p$ be a set of order-N Farey fractions. Then, p is chosen to encode $\alpha=a/b \in \mathbb{F}_p$ where $N=\lfloor\sqrt{p/2}\rfloor$. The Hensel encoding is given by $h=H(p, a/b)$. The ciphertext c is computed as $c=h^e \bmod n$. This scheme preserves the multiplicative homomorphism in the original textbook definition of RSA since p is a factor of n.

Remark 3. According to Definition 9, the message space is reduced from $\{0, \ldots, n-1\}$ to $\{0, \ldots, p-1\}$.

Remark 4. Because p is needed to encode $m \in \mathbb{Q}$ as $h \in \mathbb{Z}_p$, the encryption scheme is no longer a public-key one, instead, it is a private-key encryption scheme.

Example 13. Let e=17, p=211. q=199, n=41989, $\phi(n)=$41580 and d=22013. Let $\alpha=9/7$ be the fraction we want to encrypt. We proceed as follows:

$$h=H(p,\alpha)=H(211,9/7)=152$$

$$c=h^e \bmod n=152^{17} \bmod 41989=35864 \qquad \text{Eq. 85}$$

Decryption is computed as follows:

$$h=c^d \bmod n=35864^{22013} \bmod n=152$$

$$\alpha=H^{-1}(p,h)=9/7 \qquad \text{Eq. 86}$$

Definition 10. Hensel codes with public modulus Let $\mathbb{F}_N$ be a set of order-N Farey fractions for any given $N=\lfloor\sqrt{n/2}\rfloor$. We use n=pq to encode $\alpha=a/b \in \mathbb{F}_N$ so the Hensel encoding is given by $h=ab^{-1} \bmod n$. The ciphertext c is computed as $c=h^e \bmod n$.

Remark 5. According to Definition 10, the message space size is exactly the same as the standard RSA configuration, that is, $|\{0, \ldots, n-1\}|=n$.

Remark 6. By using n to encode $m \in \mathbb{Q}$ as $h \in \mathbb{Z}_n$, the encryption scheme remains a public-key encryption scheme.

Example 14. Let e=17, p=211, q=199, n=41989, $\phi(n)=$41580 and d=22013. Let $\alpha=9/7$ be the fraction we want to encrypt. We proceed as follows:

$$h=H(n,\alpha)=H(41989,9/7)=23995$$

$$c=h^e \bmod n=23995^{17} \bmod 41989=15608 \qquad \text{Eq. 87}$$

Decryption is computed as follows:

$$h=c^d \bmod n=15608^{22013} \bmod n=23995$$

$$\alpha=H^{-1}(n,h)=9/7 \qquad \text{Eq. 88}$$

Remark 7. The Hensel code function is homomorphic with respect to addition and multiplication. The RSA function is homomorphic with respect to multiplication. Since both functions are homomorphic with respect to multiplication, adding the Hensel code step to the RSA implementation will preserve the multiplicative homomorphism of RSA.

Example 15. Let e=23, p=227, q=173, n=39271, $\phi(n)=$38872 and d=18591. Let $\alpha_1=4/5$, $\alpha_2=7/6$, and n be used to compute the Hensel code of $\alpha_1$ and $\alpha_2$. We have $h_1 H(n, a_1)=7855$ and $h_2=H(n, a_2)=32727$. We compute $c_1$ and $c_2$ as $c_1=h_1 \bmod n=2415$ and $c_2=h_2 \bmod n=20018$. Let $c_3$ be the product of $c_1$ and $c_2$ such that $c_3=c_1 c_2 \bmod n=869$. We compute $h_3=c_3^d \bmod n=2619$ and $a_3=H^{-1}(n, h_3)=14/15$. We then verify that $a_1 a_2=4/5 \cdot 7/6=14/15=a_3$.

The methods introduced are particularly interesting if a given encryption scheme is originally designed to work over the integers and is homomorphic with respect to addition and/or multiplication since they allow such encryption scheme to operate also with rational numbers while preserving any existing homomorphism.

4. Adding Randomness to Deterministic Algorithms

In 1984, Goldwasser and Micali introduced a new model of encryption, that is, the probabilistic (or randomized) encryption while remarking its superiority in computational complexity in comparison with its deterministic counterpart. All techniques used to address this problem result in some form of ciphertext expansion.

4.1 Randomized RSA

Once again, we use the RSA cryptosystem illustrate utilities provided by Hensel codes, this time, randomization. Our goal is to modify the RSA scheme in order to add randomization without affecting its multiplicative homomorphism. We propose two versions, one that is a private-key and another that is a public-key encryption scheme.

Definition 11. Let the randomized private-key RSA be defined as follows: given e, p, q, $\phi(n)$, d from the standard RSA configuration, Enc is a probabilistic-polynomial time algorithm that, in order to encrypt a message $m \in \mathbb{Z}_p$, choose a uniform $s \in \{1, \ldots, q-1\}$ compute $H_g^{-1}((p, q), (m, s))$, then $h=H(n, \alpha)$, so the ciphertext c is given by $c=h_e \bmod n$.

Dec is a deterministic-polynomial time algorithm that, given a ciphertext c, we compute $a=H^1(n, h)$ in order to retrieve m as $m=H(p, \alpha)$.

Example 16. Let e=23, p=227, q=173, n=39271, $\phi(n)=$38872, d=18591, the message m=16, and the random number s=179. We compute $\alpha$, h and c as follows: First we compute a:

$$\alpha=H_g^{-1}((227,173),(16,179))=123/107, \qquad \text{Eq. 89}$$

then we compute h:

$$h=123 \cdot 107^{-1} \bmod 39271=123 \cdot 19452 \bmod 39271=36336. \qquad \text{Eq. 90}$$

The ciphertext c is computed as:

$$c=h^e \bmod n=36336^{23} \bmod 39271=20893. \qquad \text{Eq. 91}$$

Decryption is computed as follows: we first recover h:

$$h=c^d \bmod n=20893^{18591} \bmod 39271=36336, \qquad \text{Eq. 92}$$

then we compute a:

$$\alpha=H^{-1}(n,h)=H^{-1}(39271,36336)=123/107, \qquad \text{Eq. 93}$$

so we can finally recover m:

$$m=ab^{-1} \bmod p=123 \cdot 107^{-1} \bmod 39271=123 \cdot 157 \bmod 227=16. \qquad \text{Eq. 94}$$

Remark 8. According to Theorem 10, we could simplify the encryption function to be:

$$h = q(q^{-1} \bmod p)m + p(p^1 \bmod q)s \ c = h^e \bmod n \qquad \text{Eq. 95}$$

however, in order to keep notation and strategy consistent with the remainder of this work, which include constructions with more than two primes, we favor generalization and express the computations in terms of single and multiple Hensel codes.

Remark 9. The randomization in Definition 11 is given by s. If s is uniformly random in the set $\{1, q-1\}$, then there will be q-1 possible values for h and c for every message m that is encrypted.

Example 17. Let p=227, q=173, n=39271. If the message m=23 and s=202, $\alpha = H_g^{-1}((p,q), (m, s)) = 73/92$ and h=H (n, a)=17502, thus $c = h^e \bmod n = 20747$. If the same message is accompanied of s=234, $\alpha = H_g^{-1}((p, q), (m, s)) = 67/72$, h=H (n, $\alpha$)=19091, hence $c = h^e \bmod n = 6900$.

Definition 12. Let the randomized public-key RSA be defined as follows: given e, p, q, n, $\phi(n)$, d from the standard RSA configuration, and let two additional public primes x, y, xy<n be considered such that:

Enc is a probabilistic-polynomial time algorithm that, in order to encrypt a message $m \in \mathbb{Z}_x$, choose a uniform $s \in \{1, \ldots, y-1\}$ compute $\alpha = H_g^{-1}((x, y), (m, s))$, then h=H (n, $\alpha$), so the ciphertext c is given by $c = h^e \bmod xyn$.

Dec is a deterministic-polynomial time algorithm such that, given a ciphertext c, we compute $\alpha = H^{-1}(n, h)$ in order to retrieve m as $m = H(x, \alpha)$.

Remark 10. Since x, y, n are public, only public information is required for encrypting, thus the proposed randomized RSA encryption scheme remains a public-key one and multiplicative homomorphic. If one is not interested in homomorphism, the encryption can be computed as $c = h^e \bmod n$.

Remark 11. Similar to what we discussed in Section 3, we are adding Hensel codes to the RSA recipe as a tool of representation, meaning, we are transforming a deterministic encryption scheme into a probabilistic one by representing a message m together with a random s as a 2-digit Hensel code (m, s), which is then represented as a Farey fraction $\alpha$. As we discussed in Section 2.5, there is a unique Farey fraction $\alpha$ for each k-digit Hensel code with respect to k primes.

5. Distributed Computation

Bertsekas and Tsitsiklis compare the improvement in computing power brought by distributed computing systems, together with parallel computing, to a quantum leap. In fact, a growing interest in distributed architectures is transforming the way that systems, in general, are designed and maintained. It seems reasonable to believe that if there a computational advantage in allowing a certain operation to be outsourced to multiple independent computing units, that is, servers, IoT devices, virtual machines, threads, etc., then it would be even more valuable to have this same procedure executed in a privacy-preserving manner. To address this issue, we propose a fully-homomorphic encryption scheme designed to allow multiple parties to jointly and homomorphically compute an operation over assigned encrypted inputs. Here we will consider an operation as any combination of additions and multiplications. Examples of possible applications include parallel computing, multi-party computation and distributed systems.

We define the syntax of distributed private-key fully homomorphic encryption (FHE) scheme as follows:

Definition 13. A distributed private-key FHE scheme $\mathfrak{D}$=(Gen, Enc, Dec) is a tuple of efficient (i.e., probabilistic polynomial-time) algorithms with the following syntax:

The key-generation algorithm Gen takes as input the security parameter $1^\lambda$ and a positive integer t that determines in how many units the computation will be distributed and outputs a private-key sk and a public evaluation key pk. The secret key implicitly defines a ring $\mathbb{R}$ that will serve as the message space. We write this as (sk, pk)←Gen $(1^\lambda, t)$.

The encryption algorithm Enc takes as input a secret key sk and message m and outputs t ciphertexts $(c_1, c_t)$. We write this as $(c_1, c_t) \leftarrow$ Enc (sk, m).

The decryption algorithm Dec takes as input a secret key sk and a t ciphertexts $(c_1, c_t)$ and output a message m. We write this as m←Dec (sk, $(c_1, c_t)$).

Addition and multiplication are computed such that, given $(a_1, \ldots, a_t)$=Enc (sk, a) and $(b_1, \ldots, b_t)$=Enc (sk, b), the distributed computation of a+b is computed as $a_i + b_i$, the distributed computation of a·b is computed as $a_i \cdot b_i$ for all i, i=1 . . . t.

Correctness requires the following:

1. For all sk, k output by Gen, and all $m \in \mathbb{R}$ we have:

$$Dec(sk, Enc(sk, m)) = m. \qquad \text{Eq. 96}$$

2. For all $(a_{t+1}, \ldots, a_{2t}) \leftarrow$ Enc (sk, a) and $(b_{t+1}, b_{2t})$ Enc (sk, b), when operations are computed at the Hensel digit level, which we denote by $(a_{t+1} o b_{t+1} \bmod pk, \ldots, a_{2t} o b_{2t} \bmod pk)$ we have:

$$Dec(sk, Enc(sk, a o b)) = a o b, \qquad \text{Eq. 97}$$

where $o \in \{+, \cdot\}$.

Definition 14. A distributed private-key FHE scheme $\mathfrak{D}$ is secure if for a uniform $m \in \mathbb{R}$, all (sk, pk)←Gen $(1^\lambda, t)$ and all $(c_1, \ldots, c_t) \leftarrow$ Enc (sk, m), no efficient adversary $\mathcal{A}$ can recover m by knowing only pk and $(c_1, \ldots, c_t)$.

5.1 Description of the Scheme

We now describe the distributed private-key FHE scheme.

Gen takes as input the security parameter $1^\lambda$ and a positive integer t that determines the number of computable units the scheme will distribute the computation to, chooses uniform $\lambda$-bit primes $p_1, \ldots, p_t$ and uniform $d\lambda$-bit primes $p_{t+1}, \ldots, p_{2t}$, for a fixed positive integer $d \geq t$. Set $g := \prod_{i=1}^{2t} p_i$. Output the secret key sk=$(p_1, \ldots, p_{2t})$ and pk=g. The message space is $\mathbb{R} = \mathbb{Z}_{p1}$.

Enc takes as input sk and $m \in \mathbb{Z}_{p1}$ and proceeds as follows:

1. Choose uniform random numbers $s_2, \ldots, s_t$ from $\mathbb{Z}_{p2}, \ldots, \mathbb{Z}_{pt}$, respectively.

2. Compute $\alpha = H_g^{-1}((p_1, \ldots, p_t), (h_1, \ldots, h_{2t}))$, where:

$$(h_1, \ldots, h_t) = (m, s_2, \ldots, s_t). \qquad \text{Eq. 98}$$

3. Compute $(h_{t+1}, \ldots, h_{2t}) = H_g((p_{t+1}, \ldots, p_{2t}), \alpha)$.

4. Output $(h_{t+1}, \ldots, h_{2t})$.

Dec takes as input sk and $(h_{t+1}, \ldots, h_{2t})$, and proceeds as follows:

1. Compute $\alpha = H_g^{-1}((p_{t+1}, \ldots, p_{2t}), (h_{t+1}, \ldots, h_{2t}))$.

2. Compute $m = H(p_1, \alpha)$.

3. Output m.

Addition and multiplication are computed at the Hensel digit level reduced modulo g.

Theorem 12. For all sk output by Gen and all $m \in \mathbb{Z}_{p1}$ we have:

$$Dec(sk, Enc(sk, m)) = m. \qquad \text{Eq. 99}$$

Proof. The proof for Theorem 12 is the combination of the proofs for Theorem 10, which states that k-digit Hensel codes are equivalent to single-digit Hensel codes, Theorem 3, which states the correctness of the forward mapping of Hensel codes, and Theorem 4, which states the correctness of the backward mapping of Hensel codes. According to the definition of key-generation algorithm, Gen outputs t λ-bit primes and t dλ-bit primes where d≥t which satisfies correctness since in the first step of the encryption, the computation of $\alpha = a/b$, that is $\alpha = H_g^{-1}((p_1, \ldots, p_t), (h_1, \ldots, h_{2t}))$, will result on an order-N Farey fraction in $\mathbb{F}_{\Pi_{i=1}^t p_i}$ where N is given by $N = \lfloor \sqrt{(\Pi_{i=1}^t p_i)/2} \rfloor$ and therefore:

$$|a| \leq N, 0 < |b| \leq (\Pi_{i=1}^t p_i)/(N+1).\qquad\text{Eq. 100}$$

In the second step of the encryption, a is transformed into t ciphertexts, that is, $(h_{t+1}, \ldots, h_{2t})$, using the dλ-bit primes, which is clearly exponentially larger than the first t λ and therefore allows correct encryption and decryption with a depth d for multiplications given that all a generated with t λ-bit primes will be encoded with t dλ-bit primes, so the depth d can be expressed in terms of bits as follows:

$$d = \frac{td\lambda}{t\lambda}.\qquad\text{Eq. 101}$$

Theorem 13. For all $(a_{t+1}, \ldots, a_{2t}) \leftarrow \text{Enc}(sk, a)$, $(b_{t+1}, \ldots, b_{2t}) \leftarrow \text{Enc}(sk, b)$, and $(a_{t+1} o b_{t+1} \bmod pk, \ldots, a_{2t} o b_{2t} \bmod pk)$, we have:

$$(a_{t+1} o b_{t+1} \bmod pk, \ldots, a_{2t} o b_{2t} \bmod pk) = \text{Enc}(sk, aob),\qquad\text{Eq. 102}$$

and therefore, $$\text{Dec}(sk, \text{Enc}(sk, aob)) = aob,\qquad\text{Eq. 103}$$

where $o \in \{+, \cdot\}$.

Proof. The proof for Theorem 13 is the combination of proofs for Theorem 10, which states that k-digit Hensel codes are equivalent to single-digit Hensel codes, and Theorem 9, which states the isomorphisms between order-N Farey fractions and their corresponding Hensel codes.

5.1.1 Security of the Scheme

The distributed private-key FHE scheme consists of computing an order-N Farey fraction α where $N = \lfloor \sqrt{(\Pi_{i=1}^t p_i)/2} \rfloor$, for a t-digit Hensel code $(h_1, \ldots, h_t) = (m, s_2, \ldots, s_t)$, then computing an additional t-digit Hensel code $(h_{t+1}, \ldots, h_{2t})$ using the primes $p_{t+1}, \ldots, p_{2t}$ where the homomorphic computation will be conducted independently on each digit in $(h_{t+1}, \ldots, h_{2t})$ reduced mod g where $g = \Pi_{i=1}^{2t} p_i$. We show if one knows the order-N Farey fraction α and an integer $k_i$ for each ciphertext in $(h_{t+1}, \ldots, h_{2t})$, then one can efficiently factor $p_{t+1}, \ldots, p_{2t}$ and $p_1$ from g.

Recall that for all a/b in $\mathbb{F}_p$ a Hensel code h is computed as $h = ab^{-1} \bmod p$, which can be rewritten as the following diophantine equation:

$$a = bh + kp,\qquad\text{Eq. 104}$$

and from Eq. 104 we can derive:

$$b = (a - kp)/h k = (a - bh)/p,\qquad\text{Eq. 105}$$

and it is clear that if one can compute the k associated with a/b and h, then computing p is as trivial as:

$$p = (a - bh)/k.\qquad\text{Eq. 106}$$

Lemma 7. Given a message m and its correspondent ciphertexts $(h_{t+1}, \ldots, h_{2t})$, if one can compute α and each $(k_{t+1}, k_{2t})$ corresponding to each one of the t ciphertexts such that:

$$(k_{t+1}, \ldots, k_{2t}) = ((bh_{t+1} - a)/p_{t+1}, \ldots, (bh_{2t} - a)/p_{2t})\qquad\text{Eq. 107}$$

then one can efficiently factor $p_{t+1}, \ldots, p_{2t}$ and $p_1$ from g, which is the minimum required information for a total break of the scheme.

Proof. Recall that $g = \Pi_{i=1}^{2t} p_i$ and, each $h_i$ in $(h_{t+1}, \ldots, h_{2t})$ is computed as $(ab^{-1} \bmod p_{t+1}, \ldots, ab^{-1} \bmod p_{2t})$ where $\alpha = a/b$, which can be rearranged as:

$$(h_{k+1}b - a = k_{k+1}p_{k+1}, \ldots, h_{2t}b - a = k_{2t}p_{2t})\qquad\text{Eq. 108}$$

for some integers $k_{t+1}, \ldots, k_{2t}$. Thus, if one can solve for a/b each $k_i$ associate with each public $h_i$ in:

$$k_{t+1} = (bh_{t+1} - a)/p_{t+1}\ a = h_{t+1}b - kp_{t+1}\ b = (a + kp_{t+1})/h_{t+1}$$

$$k_{2t} = (bh_{2t} - a)/p_{2t}\ a = h_{2t}b - kp_{2t}\ b = (a + kp_{2t})/h_{2t}\qquad\text{Eq. 109}$$

and $k_1 = (bm - a)/p_1$, then one can efficiently factor $p_{t+1}, \ldots, p_{2t}$ and $p_1$ from g since:

$$p_i = (bh_i - a)/k_i, i = t+1 \ldots 2t\ p_1 = (bm - a)/k_1\qquad\text{Eq. 110}$$

Figure 2:
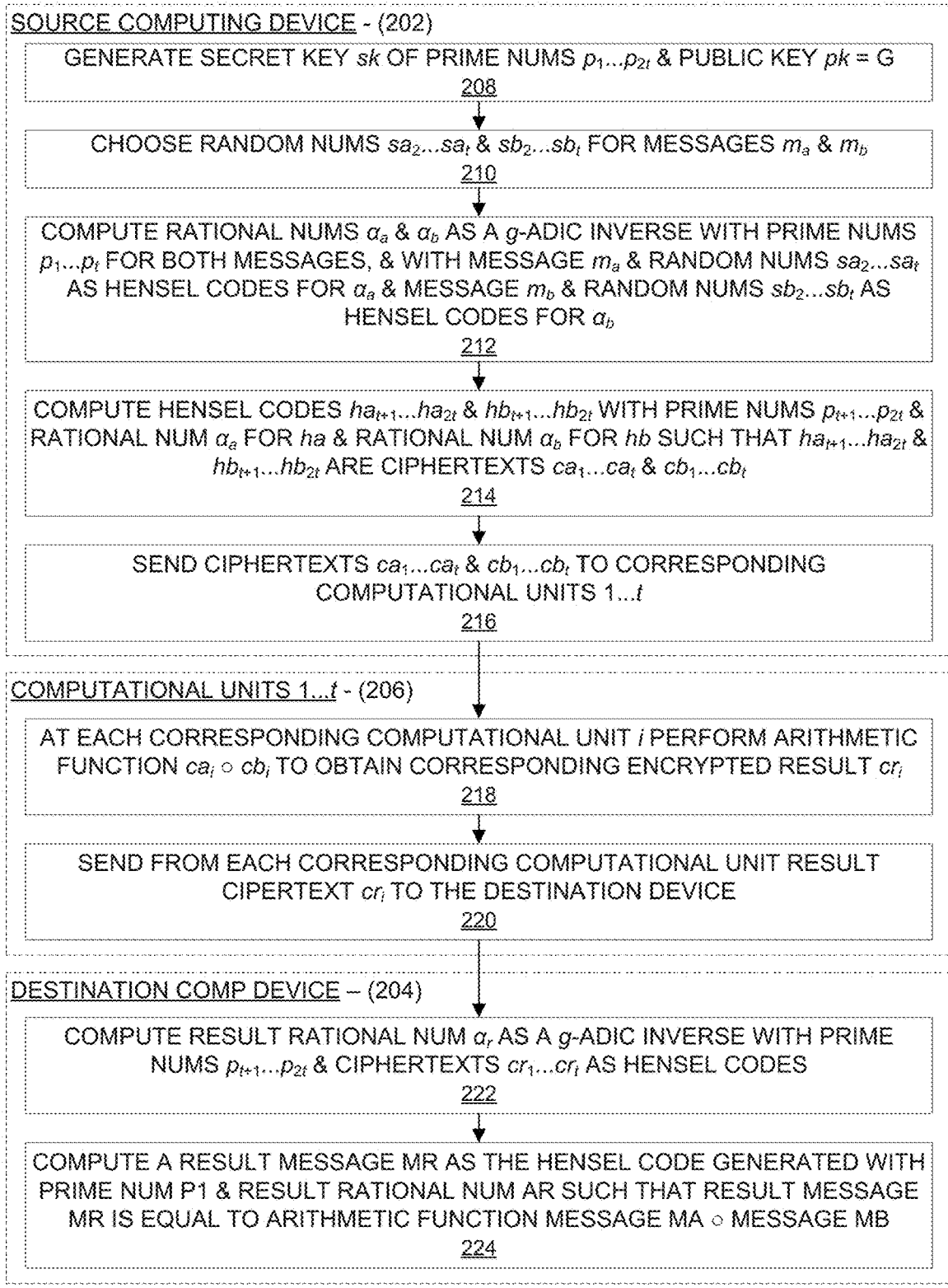
FIG. 2 is a flow chart of operations for a FHE distributed computation embodiment.

FIG. 2 is a flow chart of operations for a FHE distributed computation embodiment.

Hardware Implementation for a FHE Distributed Computation Embodiment (FIG. 1)

FIG. 1 is a block diagram 100 of the hardware implementation for a Fully Homomorphic Encryption (FHE) system distributed computation embodiment. A source device 102 is connected over an electronic network/bus connection 106 to computational units 1 to t (110 to 114). The computational units 1 to t (110 to 114) are, in turn, connected to the destination device 104. In the embodiment shown in FIG. 1, the source device 102 acts as the source of the distributed encrypted data 108 and the source device 102 sends the encrypted data 108 over the network/bus connection 106 to the computational units 1 to t (110 to 114) as the individual Hensel digit level for each computational unit 1 to t (110 to 114). The computational units 1 to t (110 to 114) perform arithmetic operations (addition or multiplication) on the corresponding individual Hensel digit level encrypted values and then sends the Hensel digit level encrypted results 108 to the destination device 104. The destination device 104 acts as a destination for the encrypted data 108 received from the network/bus connection 106. Generally, communications, including concealed/encrypted communications, are bi-directional such that the source 102, computational units 1 to t (110 to 114), and destination 104 devices may change roles as the encrypted data 108 source 102, computational unit 1 to t (110 to 114), and the encrypted data 108 destination 104 as is necessary to accommodate the transfer of data back and forth between the computing devices 102, 104, 110, 112, 114. Additionally, while the computing devices 102, 104, 110, 112, 114 are depicted as separate devices in FIG. 1, the functionality of the source device 102, the computational units 1 to t (110 to 114) and the destination device 104 may be shared on a single computing system/device or among two or more computing devices as it is often desirable to conceal data when transferring data between components of a single device.

Further, as shown in FIG. 1, the source device 102 appears to be a laptop computer and the destination device 104 appears to be a tablet device and the computational units 1 to t (110 to 114) are simply shown as basic computational blocks. Generally, any computing device capable of communication over any form of electronic network or bus communication platform 106 may be one or more of the source 102, the computational unit 1 to t (110 to 114) and destination 104 computing devices. Additionally, the source 102, computational unit 1 to t (110 to 114) and/or destination 104 computing devices may actually be the same physical computing device communicating over an internal bus connection 106 with itself, but still desiring to encrypt transferred data to ensure that an attacker cannot monitor the internal communications bus 106 to obtain sensitive data communications in an unencrypted format.

Various embodiments may implement the network/bus communications channel 106 using any communications channel 106 capable of transferring electronic data between the source 102, computational unit 1 to t (110 to 114) and destination 104 computing devices. For instance, the network/bus communication connection 106 may be an Internet connection routed over one or more different communications channels during transmission between the source 102, computational unit 1 to t (110 to 114) and destination 104 devices. Likewise, the network/bus communication connection 106 may be an internal communications bus of a computing device, or even the internal bus of a processing or memory storage Integrated Circuit (IC) chip, such as a memory chip or a Central Processing Unit (CPU) chip. The network/bus communication channel 106 may utilize any medium capable of transmitting electronic data communications, including, but not limited to: wired communications, wireless electro-magnetic communications, fiber-optic cable communications, light/laser communications, sonic/sound communications, etc., and any combination thereof of the various communication channels.

The various embodiments may provide the control and management functions detailed herein via an application operating on the source 102, computational unit 1 to t (110 to 114) and/or destination 104 computing devices. The source 102, computational unit 1 to t (110 to 114) and/or destination 104 computing devices may each be a computer or computer system, or any other electronic devices device capable of performing the communications and computations of an embodiment. The source 102, computational unit 1 to t (110 to 114) and/or destination 104 devices may include, but are not limited to: a general-purpose computer, a laptop/portable computer, a tablet device, a smart phone, an industrial control computer, a data storage system controller, a CPU, a Graphical Processing Unit (GPU), an Application Specific Integrated Circuit (ASI), and/or a Field Programmable Gate Array (FPGA). Notably, the first 102 and/or second 104 computing devices may be the storage controller of a data storage media (e.g., the controller for a hard disk drive) such that data delivered to/from the data storage media is always encrypted so as to limit the ability of an attacker to ever have access to unencrypted data. Embodiments may be provided as a computer program product which may include a computer-readable, or machine-readable, medium having stored thereon instructions which may be used to program/operate a computer (or other electronic devices) or computer system to perform a process or processes in accordance with the various embodiments. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

Operational Flow Chart for a FHE Distributed Computation Embodiment (FIG. 2)

FIG. 2 is a flow chart 200 of operations for a FHE distributed computation embodiment. The arithmetic computation o is spread across a number t computational units 206 of the private-key Fully Homomorphic Encryption (FHE) system, where t is at least 2. At process 208, the source computing device 202 generates a secret key sk comprised of prime numbers $p_1 \ldots p_{2t}$ and public evaluation key pk equal to g of a g-adic number system. At process 210, the source computing device 202 chooses random numbers $sa_2 \ldots sa_t$ for a message $m_a$ and random numbers $sb_2 \ldots sb_t$ for a message $m_b$. At process 212, the source computing device 202 computes rational number $\alpha_a$ as a g-adic number inverse $H_g^{-1}$ with the prime numbers $p_1 \ldots p_t$ and Hensel codes $ha_1 \ldots ha_t$ where the Hensel codes $ha_1 \ldots ha_t$ are the message $m_a$ and the random numbers $sa_2 \ldots sa_t$, and computes rational number $\alpha_b$ as a g-adic number inverse $H_g^{-1}$ with the prime numbers $p_1 \ldots p_t$ and Hensel codes $hb_1 \ldots hb_t$ where the Hensel codes $hb_1 \ldots hb_t$ are the message $m_b$ and the random numbers $sb_2 \ldots sb_t$. At process 214, the source computing device computes Hensel codes $ha_{t+1} \ldots ha_{2t}$ as g-adic Hensel codes $H_g$ from the prime numbers $p_{t+1} \ldots p_{2t}$ and the rational number $\alpha_a$ such that the Hensel codes $ha_{t+1} \ldots ha_{2t}$ are message $m_a$ ciphertexts $ca_1 \ldots ca_t$, and computes Hensel codes $hb_{t+1} \ldots hb_{2t}$ as g-adic Hensel codes $H_g$ from the prime numbers $p_{t+1} \ldots p_{2t}$ and the rational number $\alpha_b$ such that the Hensel codes $hb_{t+1} \ldots hb_{2t}$ are message $m_b$ ciphertexts $cb_1 \ldots cb_t$. At process 216, the source computing device 202 sends each Hensel digit of said ciphertexts $ca_1 \ldots ca_t$ and each Hensel digit of said ciphertexts $cb_1 \ldots cb_t$ to corresponding computational units 1 . . . t (206), respectively.

At process 218, each computational unit i of computation units 1 . . . t (206) performs arithmetic function $ca_i$ o $cb_i$ to obtain encrypted result $cr_i$ corresponding to said computational unit i. The arithmetic function o is one of addition or multiplication. Also, the arithmetic function o is computed at a Hensel digit level reduced modulo g. At process 220, each computational unit i of computation units 1 . . . t (206) sends the encrypted result $cr_i$ that corresponds to the computational unit i of the computational units 1 . . . t (206) to a destination computing device (204).

At process 222, the destination computing device 204 computes a result rational number $\alpha_r$ as a g-adic number inverse $H_g^{-1}$ with the prime numbers $p_{t+1} \ldots p_{2t}$ and the encrypted results $cr_1 \ldots cr_t$ as Hensel codes for the g-adic number inverse $H_g^{-1}$. At process 224, the destination computing system 204 computes a result message $m_r$ as Hensel Code H with the prime $p_1$ and the result rational number $\alpha_r$ such that result message $m_r$ is equal to arithmetic function message $m_a$ o message $m_b$.

The foregoing description of the invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated.

What is claimed is:

1. A method for distributing an arithmetic computation o across a number t computational units of a private-key Fully Homomorphic Encryption (FHE) system, where t is at least 2, the method comprising:

generating by a source device a secret key sk comprised of prime numbers $p_1 \ldots p_{2t}$ and public evaluation key pk equal to g of a g-adic number system;

choosing by said source device random numbers $sa_2 \ldots sa_t$ for a message $m_a$;

computing by said source device rational number $\alpha_a$ as a g-adic number inverse $H_g^{-1}$ with said prime numbers $p_1 \ldots p_t$ and Hensel codes $ha_1 \ldots ha_t$ where said Hensel codes $ha_1 \ldots ha_t$ are said message $m_a$ and said random numbers $sa_2 \ldots sa_t$;

computing by said source device Hensel codes $ha_{t+1} \ldots ha_{2t}$ as g-adic Hensel codes $H_g$ from said prime numbers $p_{t+1} \ldots p_{2t}$ and said rational number $\alpha_a$ such that said Hensel codes $ha_{t+1} \ldots ha_{2t}$ are message $m_a$ ciphertexts $ca_1 \ldots ca_t$;

choosing by said source device random numbers $sb_2 \ldots sb_t$ for a message $m_b$;

computing by said source device rational number $\alpha_b$ as a g-adic number inverse $H_g^{-1}$ with said prime numbers $p_1 \ldots p_t$ and Hensel codes $hb_1 \ldots hb_t$ where said Hensel codes $hb_1 \ldots hb_t$ are said message $m_b$ and said random numbers $sb_2 \ldots sb_t$;

computing by said source device Hensel codes $hb_{t+1} \ldots hb_{2t}$ as g-adic Hensel codes $H_g$ from said prime numbers $p_{t+1} \ldots p_{2t}$ and said rational number $\alpha_b$ such that said Hensel codes $hb_{t+1} \ldots hb_{2t}$ are message $m_b$ ciphertexts $cb_1 \ldots cb_t$;

sending by said source device each Hensel digit of said ciphertexts $ca_1 \ldots ca_t$ and each Hensel digit of said ciphertexts $cb_1 \ldots cb_t$ to corresponding computational units 1 . . . t, respectively;

performing at each computational unit i of said computational units 1 . . . t arithmetic function $ca_i$ o $cb_i$ to obtain encrypted result $cr_i$ corresponding to said computational unit i;

sending by each of said computational units 1 . . . t said corresponding encrypted result $cr_i$ to a destination device;

computing by said destination device a result rational number $\alpha_r$ as a g-adic number inverse $H_g^{-1}$ with said prime numbers $p_{t+1} \ldots p_{2t}$ and said encrypted results $cr_1 \ldots cr_t$ as Hensel codes for said g-adic number inverse $H_g^{-1}$; and computing by said destination device a result message $m_r$ as Hensel Code Generation H with said prime $p_1$ and said result rational number $\alpha_r$ such that result message $m_r$ is equal to arithmetic function message $m_a$ o message $m_b$.

2. The method of claim 1 wherein said arithmetic function o is one of group of arithmetic functions chosen from: addition and multiplication.

3. The method of claim 1 wherein said arithmetic function o is computed at a Hensel digit level reduced modulo g.

4. A private-key Fully Homomorphic Encryption (FHE) system that distributes an arithmetic computation o across a number t computational units, where t is at least 2, the private-key FHE system comprising:

a source device, wherein said source device further comprises:

a key generation subsystem that generates a secret key sk comprised of prime numbers $p_1 \ldots p_{2t}$ and public evaluation key pk equal to g of a g-adic number system;

a random number selection subsystem that chooses random numbers $sa_2 \ldots sa_t$ for a message $m_a$ and random numbers $sb_2 \ldots sb_t$ for a message $m_b$;

a message value to rational number subsystem that computes rational number $\alpha_a$ as a g-adic number inverse $H_g^{-1}$ with said prime numbers $p_1 \ldots p_t$ and Hensel codes $ha_1 \ldots ha_t$ where said Hensel codes $ha_1 \ldots ha_t$ are said message $m_a$ and said random numbers $sa_2 \ldots sa_t$, and computes rational number $\alpha_b$ as a g-adic number inverse $H_g^{-1}$ with said prime numbers $p_1 \ldots p_t$ and Hensel codes $hb_1 \ldots hb_t$ where said Hensel codes $hb_1 \ldots hb_t$ are said message $m_b$ and said random numbers $sb_2 \ldots sb_t$;

an encryption subsystem that computes Hensel codes $ha_{t+1} \ldots ha_{2t}$ as g-adic Hensel codes $H_g$ from said prime numbers $p_{t+1} \ldots p_{2t}$ and said rational number $\alpha_a$ such that said Hensel codes $ha_{t+1} \ldots ha_{2t}$ are message $m_a$ ciphertexts $ca_1 \ldots ca_t$, and computes Hensel codes $hb_{t+1} \ldots hb_{2t}$ as g-adic Hensel codes $H_g$ from said prime numbers $p_{t+1} \ldots p_{2t}$ and said rational number $\alpha_b$ such that said Hensel codes $hb_{t+1} \ldots hb_{2t}$ are message $m_b$ ciphertexts $cb_1 \ldots cb_t$;

a ciphertext Hensel digit send subsystem that sends each Hensel digit of said ciphertexts $ca_1 \ldots ca_t$ and each Hensel digit of said ciphertexts $cb_1 \ldots cb_t$ to corresponding computational units 1 . . . t, respectively;

said computational units 1 . . . t, wherein each of said computational units 1 . . . t further comprises:

an arithmetic function subsystem that performs at each computational unit i of said computational units 1 . . . t arithmetic function $ca_i$ o $cb_i$ to obtain encrypted result $cr_i$ corresponding to said computational unit i;

an encrypted result send subsystem that sends said encrypted result $cr_i$ that corresponds to said computational unit i of said computational units 1 . . . t to a destination device; and said destination device, wherein said destination device further comprises:

a result rational number computation subsystem that computes a result rational number $\alpha_r$ as a g-adic number inverse $H_g^{-1}$ with said prime numbers $p_{t+1} \ldots p_{2t}$ and said encrypted results $cr_1 \ldots cr_t$ as Hensel codes for said g-adic number inverse $H_g^{-1}$ and a Hensel code result message recovery subsystem that computes a result message $m_r$ as Hensel Code Generation H with said prime $p_1$ and said result rational number $\alpha_r$ such that result message $m_r$ is equal to arithmetic function message $m_a$ o message $m_b$.

5. The private-key FHE system of claim 4 wherein said arithmetic function o is one of group of arithmetic functions chosen from: addition and multiplication.

6. The private-key FHE system of claim 4 wherein said arithmetic function o is computed at a Hensel digit level reduced modulo g.

* * * * *